May 21, 1940.  F. A. HAYES  2,201,176
VARIABLE SPEED POWER TRANSMISSION MECHANISM
Filed Aug. 5, 1937   16 Sheets-Sheet 1

INVENTOR
FRANK A. HAYES
BY
Cooper, Kerr & Dunham
ATTORNEYS

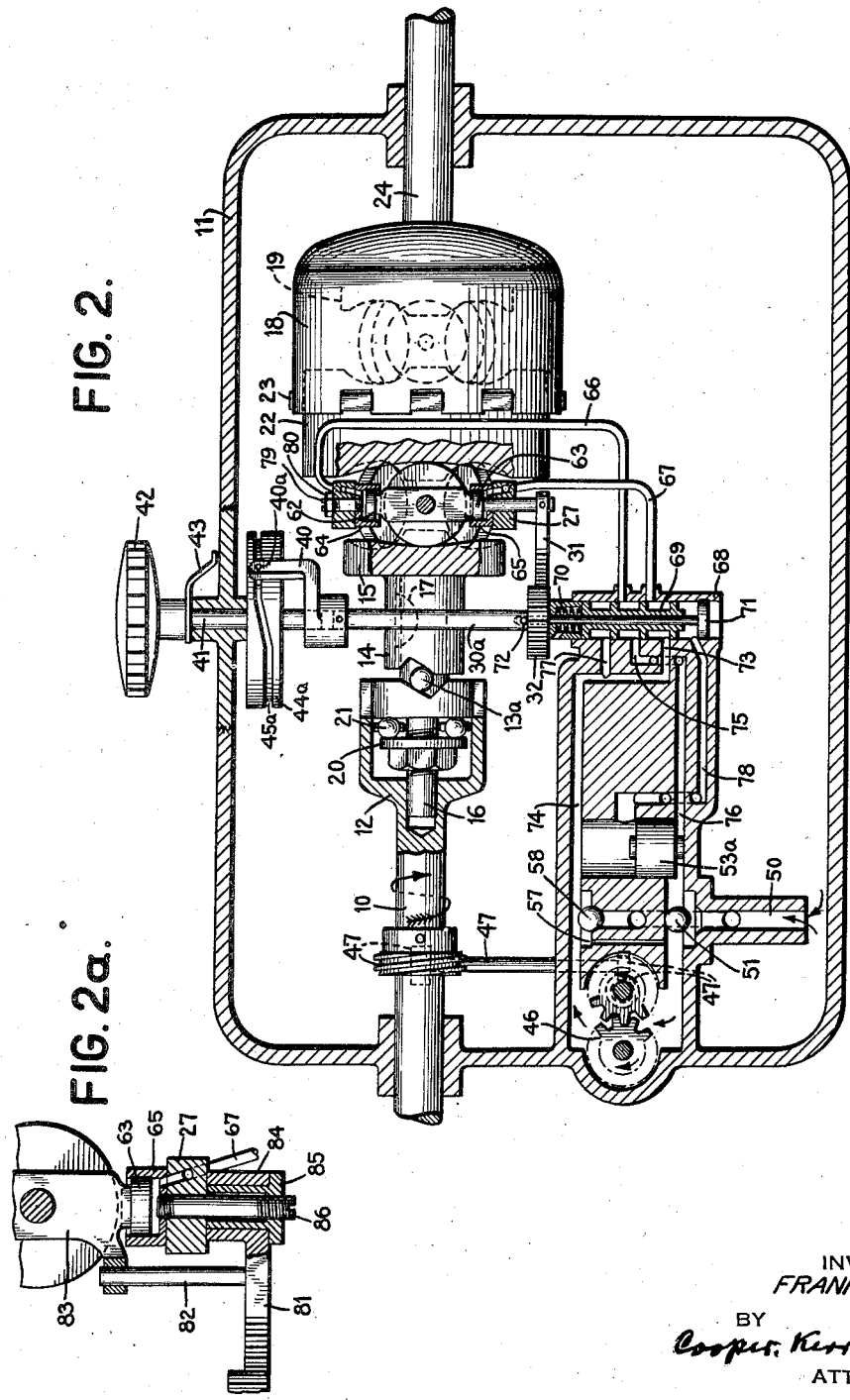

May 21, 1940. F. A. HAYES 2,201,176
VARIABLE SPEED POWER TRANSMISSION MECHANISM
Filed Aug. 5, 1937 16 Sheets-Sheet 3

INVENTOR
FRANK A. HAYES
BY
ATTORNEYS

May 21, 1940.   F. A. HAYES   2,201,176
VARIABLE SPEED POWER TRANSMISSION MECHANISM
Filed Aug. 5, 1937   16 Sheets-Sheet 4

INVENTOR
FRANK A. HAYES
BY
Cooper, Kerr & Dunham
ATTORNEYS

INVENTOR
FRANK A. HAYES
BY
Cooper, Kerr & Dunham
ATTORNEYS

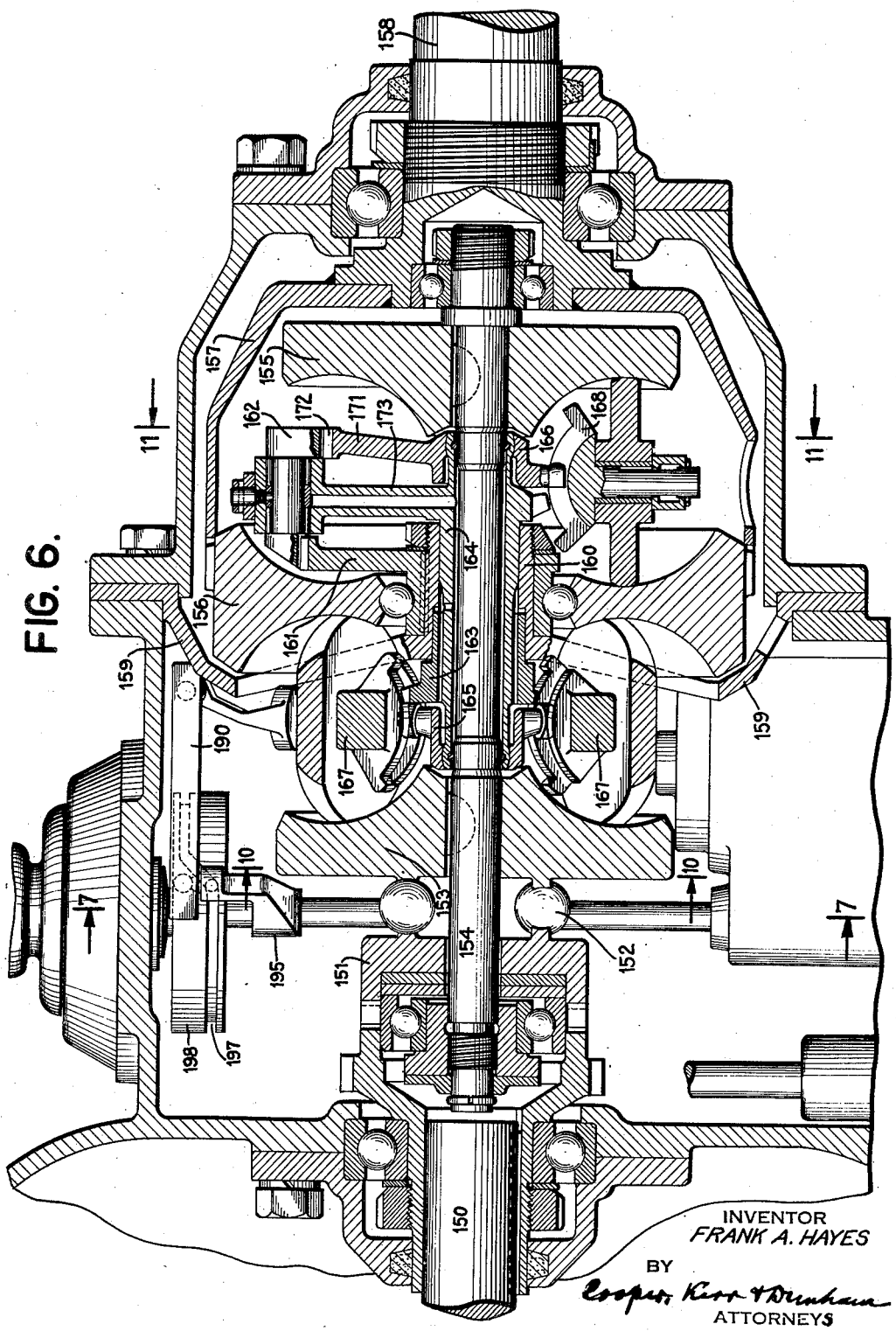

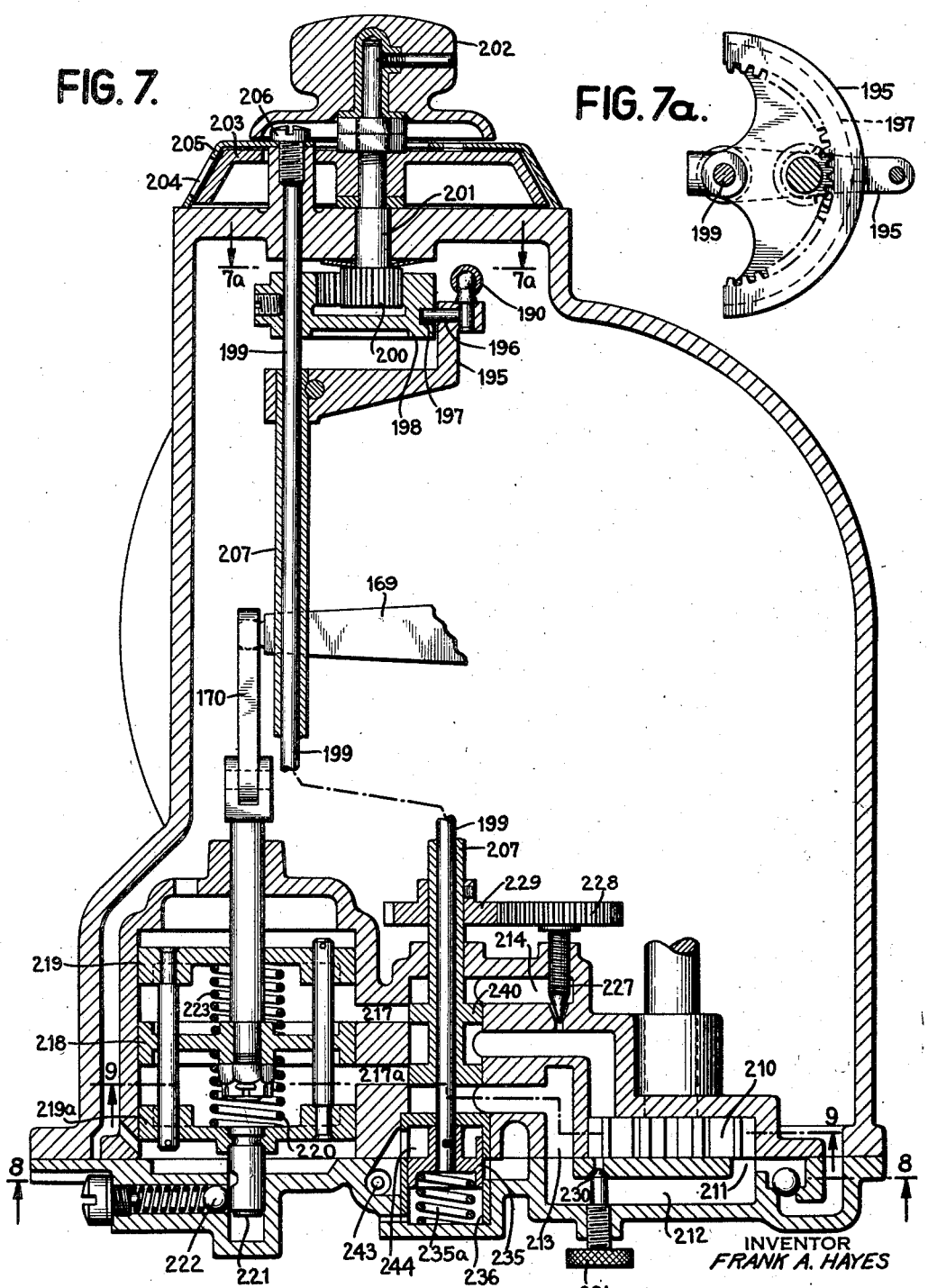

INVENTOR
FRANK A. HAYES
BY
ATTORNEYS

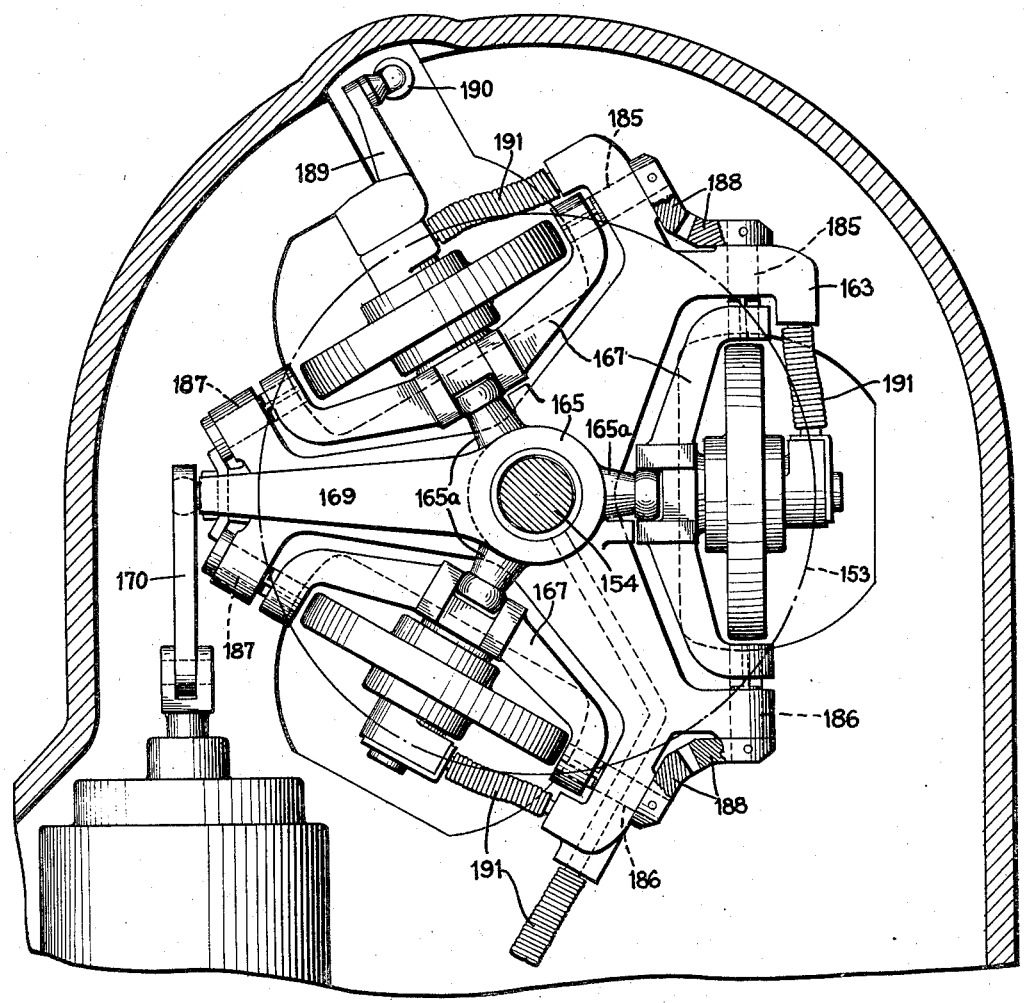

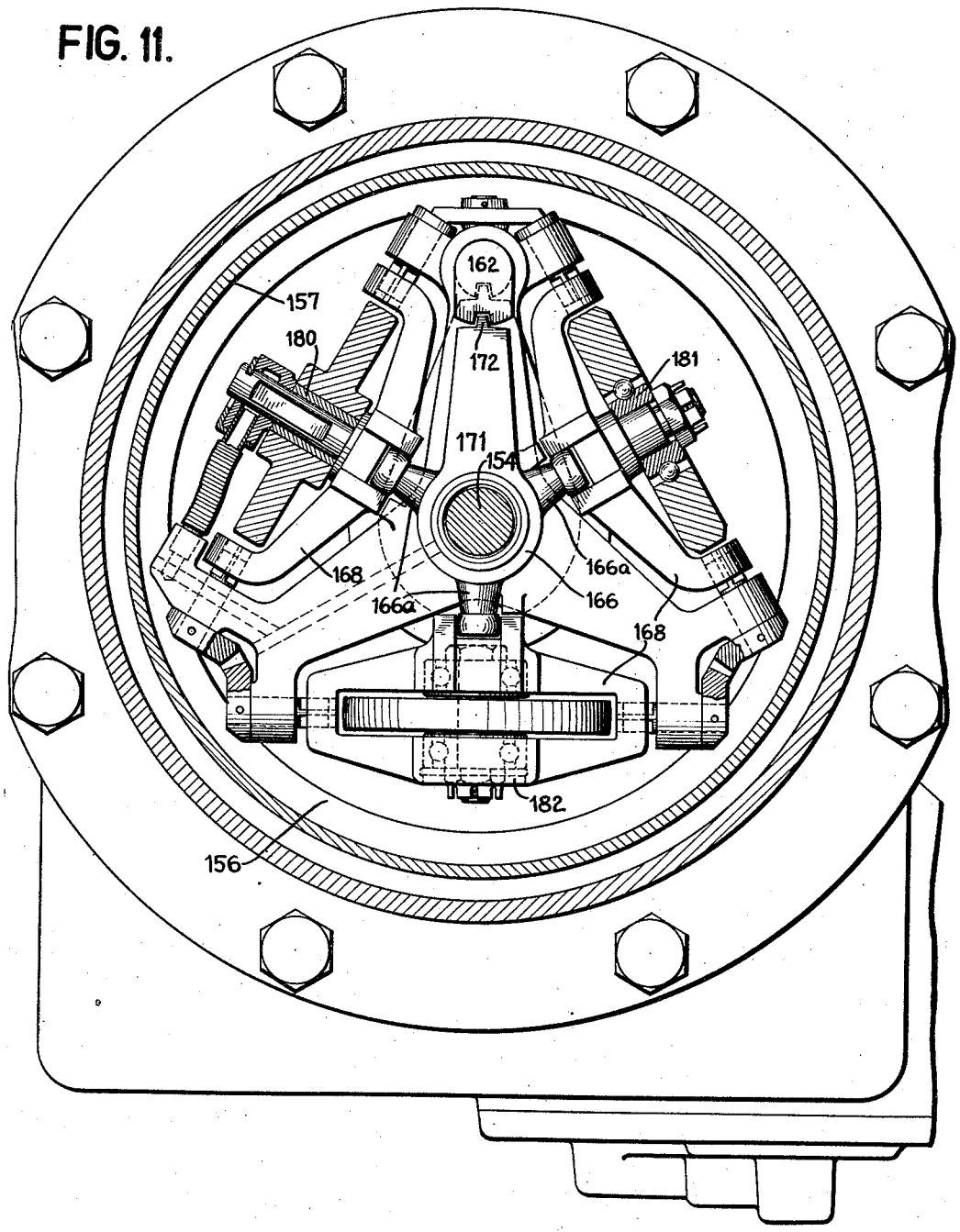

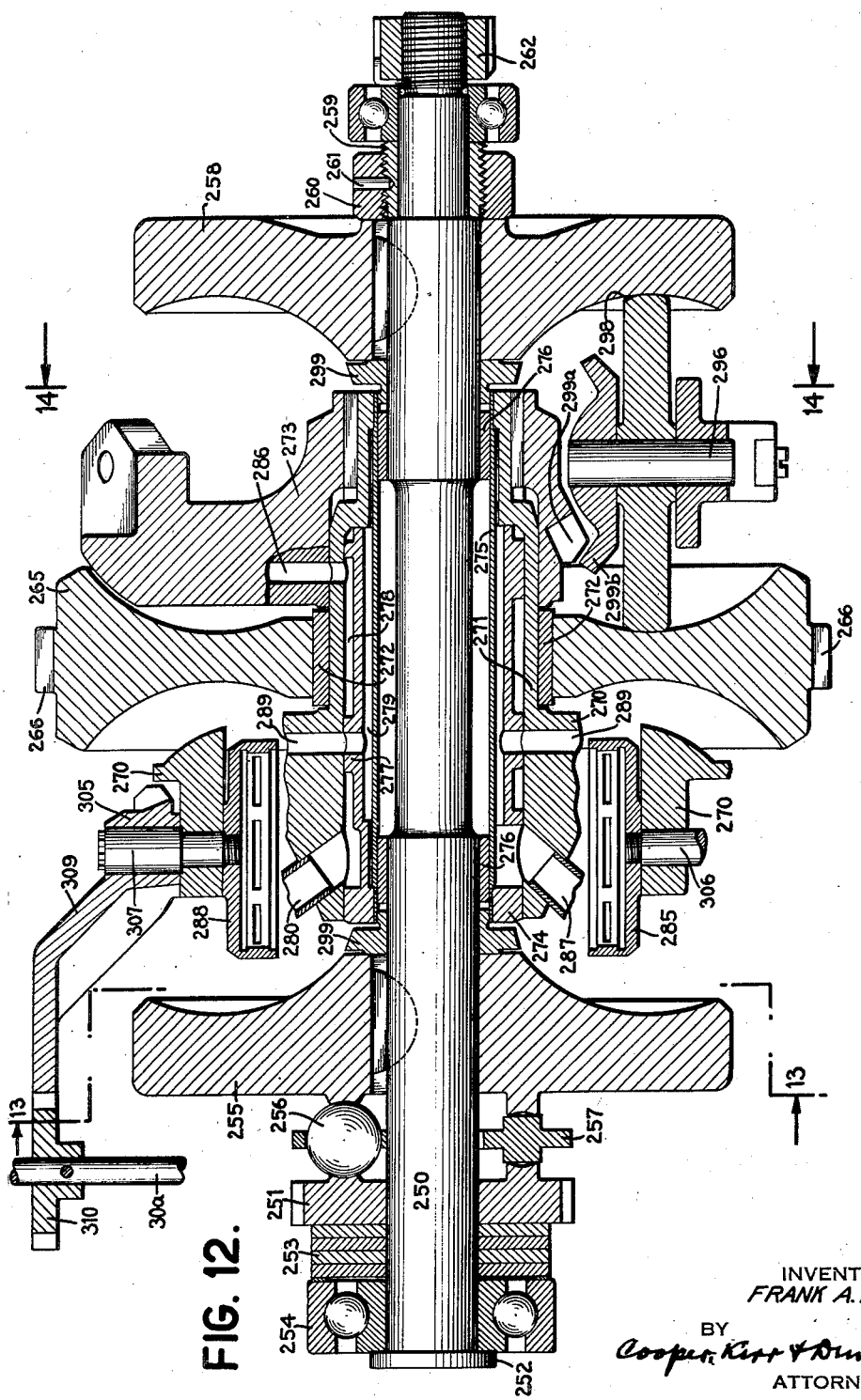

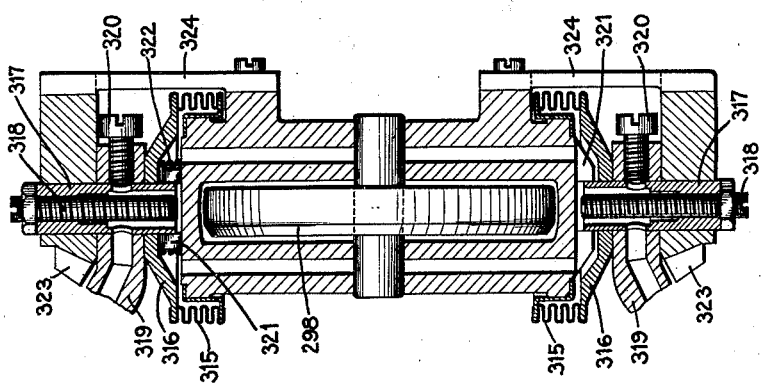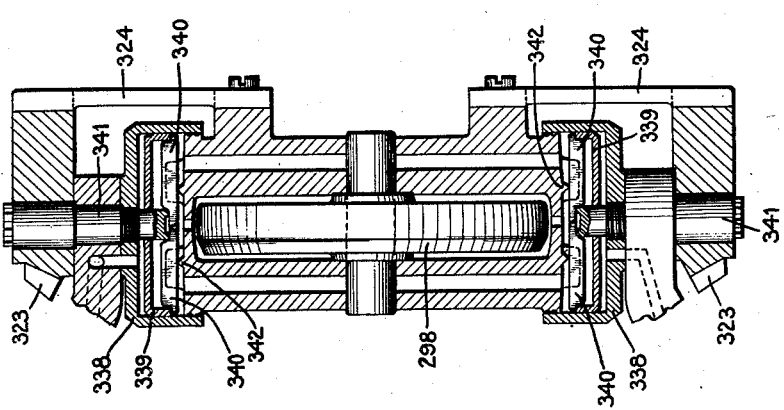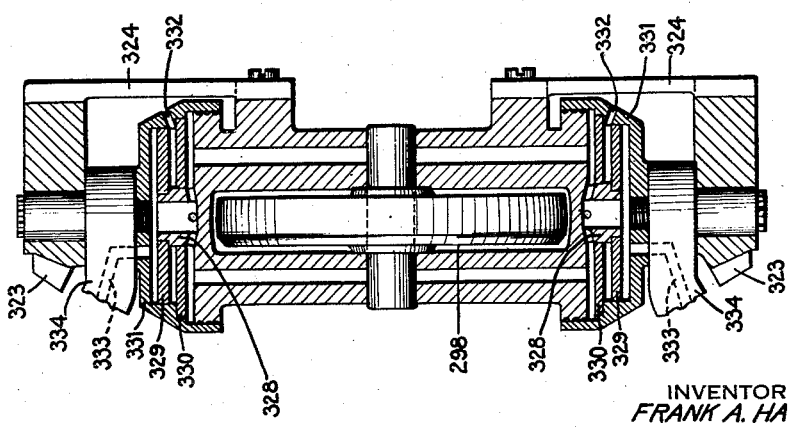

May 21, 1940.   F. A. HAYES   2,201,176
VARIABLE SPEED POWER TRANSMISSION MECHANISM
Filed Aug. 5, 1937    16 Sheets-Sheet 14

INVENTOR
*FRANK A. HAYES*
BY
ATTORNEYS

May 21, 1940.　　　　F. A. HAYES　　　　2,201,176
VARIABLE SPEED POWER TRANSMISSION MECHANISM
Filed Aug. 5, 1937　　　16 Sheets-Sheet 15

INVENTOR
FRANK A. HAYES
BY
Cooper, Kerr & Dunham
ATTORNEYS

May 21, 1940.  F. A. HAYES  2,201,176
VARIABLE SPEED POWER TRANSMISSION MECHANISM
Filed Aug. 5, 1937   16 Sheets-Sheet 16
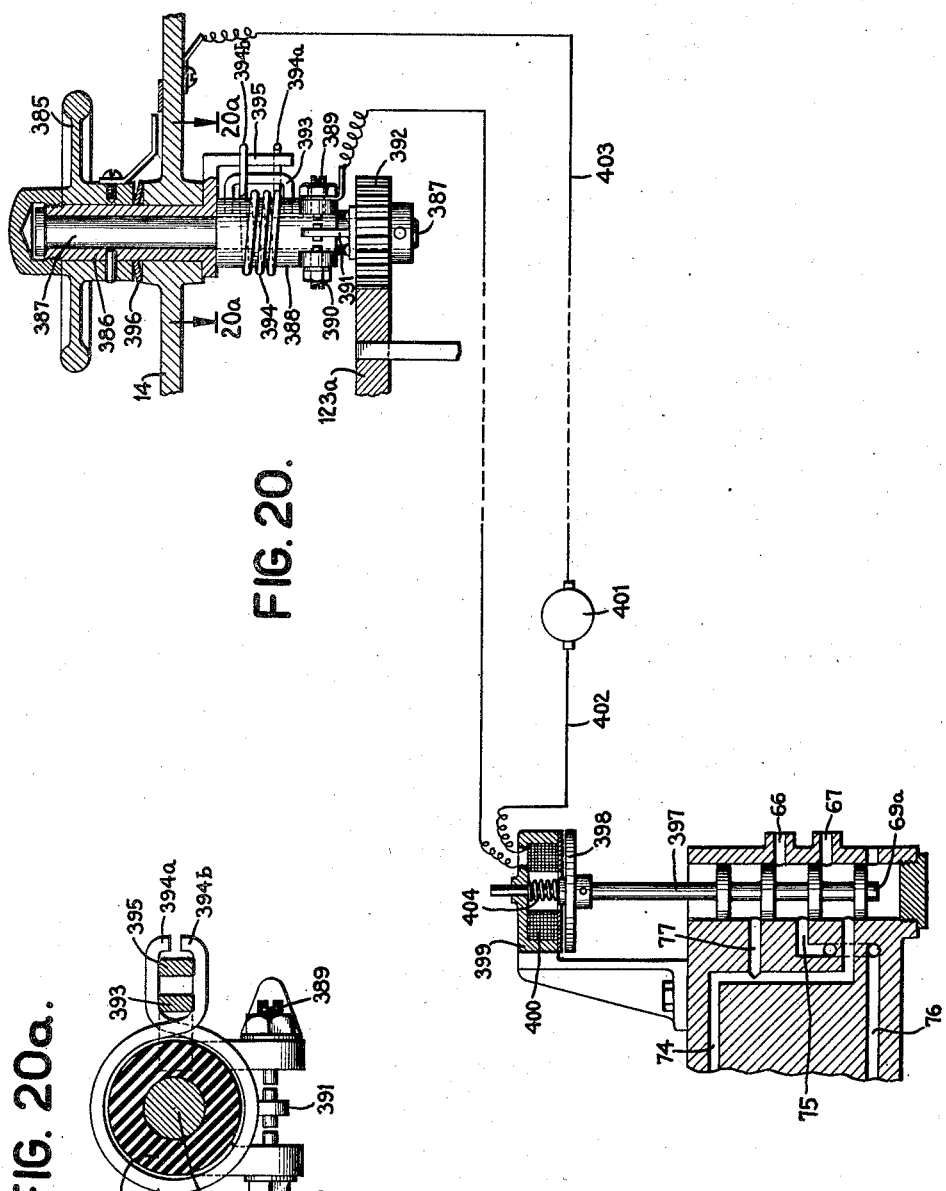
INVENTOR
*FRANK A. HAYES*
BY
*Cooper, Kerr & Dunham*
ATTORNEYS Patented May 21, 1940

2,201,176

UNITED STATES PATENT OFFICE 2,201,176

VARIABLE SPEED POWER TRANSMISSION MECHANISM

Frank Anderson Hayes, Middletown, N. J.

Application August 5, 1937, Serial No. 157,533

47 Claims. (Cl. 74—190.5)

This invention relates to variable speed power transmissions of the friction type, and is especially suitable for mechanisms having toric disks and cooperating rollers.

One object of the invention is to provide control means for a transmission of the torque responsive type in which when the direction of rotation of the transmission mechanism is reversed the direction of the forces opposing such torque response will be automatically reversed as required to balance the load.

Another object is to provide control means for a torque-responsive transmission which may be readily set to a definite speed ratio and will maintain that ratio within close limits regardless of the direction of rotation of the transmission.

Another object is to provide a transmission mechanism with a definite predetermined torque characteristic, i. e., one that will change its ratio automatically in response to torque according to a predetermined relation or curve, as for instance constant horsepower, constant output torque, or any other desired characteristic.

Another object is to provide ready means for the operator to adjust the value or magnitude of such characteristic, while running if desired, and without altering the form of the characteristic, so that, for example, if the predetermined characteristic is constant horsepower the operator can set the horsepower at which it is to operate automatically, and as long as the output torque demand of the driven device is within the limits determined by the speed ratio range and horsepower the ratio will automatically adjust itself to maintain that horsepower. Or, if the characteristic is constant output torque the value of this torque may be set. As a corollary to the above it will be seen that such control has the great advantage of limiting the load which may be applied to the transmission at any ratio above its lowest.

While the torque control mentioned above assumes an input device having a definite speed-torque characteristic, such, for example, as an induction motor, another object of the invention is to provide a control for a reversible transmission which will regulate the input speed at constant or definite input torque within the ratio limits of the transmission, i. e., with an input motor such as a gasoline engine and driving an output load such as in an automobile. In my prior United States Patents 1,865,102 and 1,937,697 I show transmission mechanisms and control means for automobiles which will operate at constant engine speed. A reversible transmission has certain advantages for this use, such as permitting the use of a reverse gear between the engine and transmission where the loads are light and also providing for such contingencies as the car drifting backwards in gear but with the clutch disengaged.

Another object is to provide means for compounding the speed ratio, i. e., increasing the ratio setting in proportion to the load to compensate for speed losses in the transmission itself and in the driving device.

Another object is to provide roller carrier control means by means of hydraulic cylinders or magnets, with the operating devices arranged within the torus grooves or within the diameters of the larger disks so as to provide a compact construction.

A further object is to provide control means which may readily be applied to a transmission with multiple sets of rollers and especially a transmission having three or more roller-sets in parallel.

A further object is to provide frictionless low speed stops for the roller carriers to facilitate operation of the control in the lowest speed position.

Another object is to provide speed ratio control means which may be set instantly to any desired speed while the actual change in speed ratio follows at a predetermined rate and within definite load limits so that the operator may set the ratio without regard to the actual rate of change and without effort, and without any possible damage to either the transmission or its connected devices.

These and other objects and advantages of the invention will be more fully understood from the drawings and description which follow.

Referring to the drawings:

Fig. 2 is a modification of the mechanism of Fig. 1, in which the displacing of the carrier is effected by means wholly hydraulic.

Fig. 2a is a fragmentary sectional view of the roller carrier and cylinder shown in Fig. 2, with provision for adjusting or determining the maximum movement of the carrier.

Figure 1:
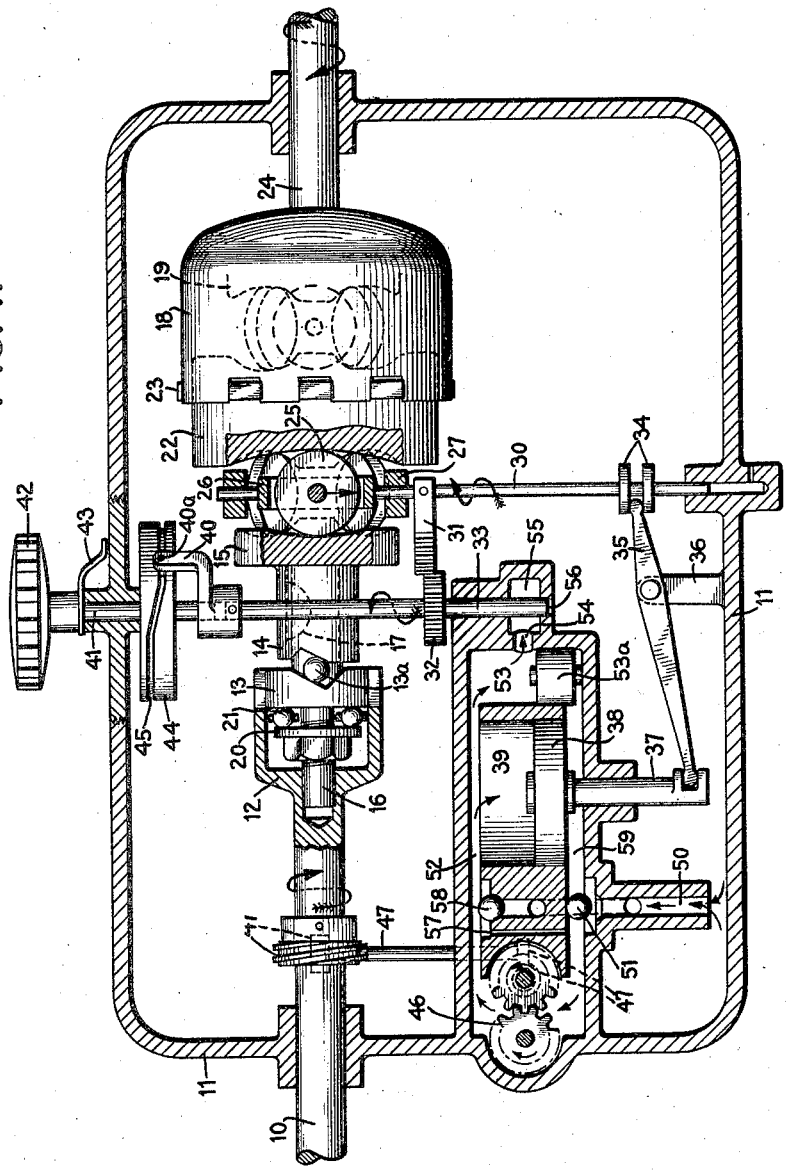
Fig. 1 illustrates somewhat diagrammatically a longitudinal section of a transmission embodying a part of my invention and having combined mechanical and hydraulic control for displacing the roller carrier to cause change of speed ratio by precession.
Figure 14:
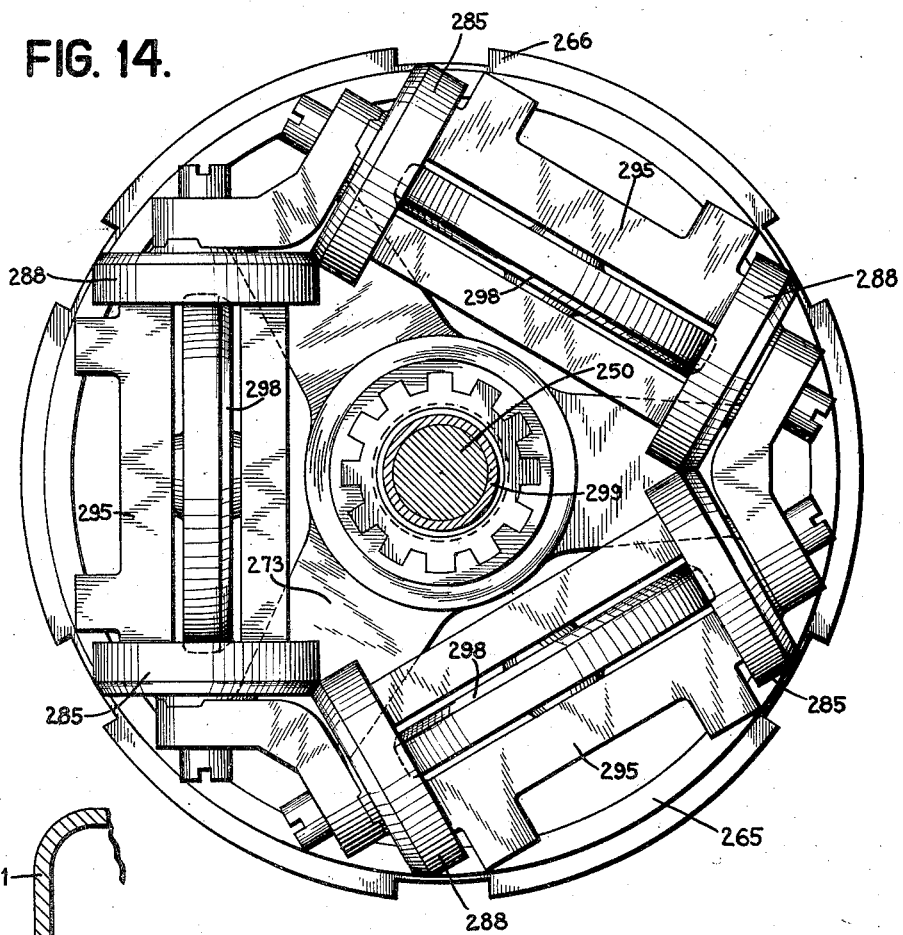
Figure 3:
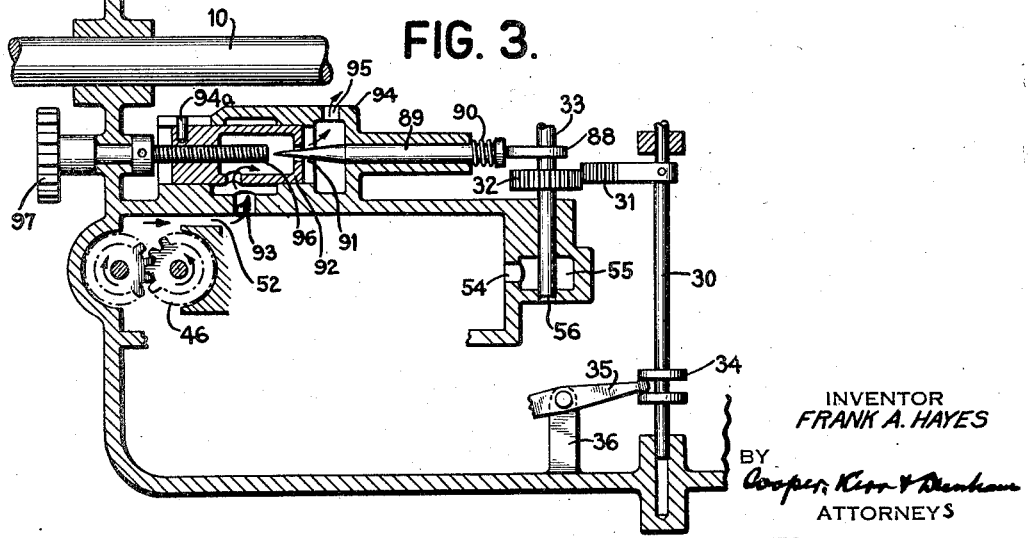

Fig. 3, on the same sheet as Fig. 14, shows a modification of part of the hydraulic control means of Fig. 1, in which an automatically variable and manually adjustable leak valve mechanism is provided.

Figure 13:
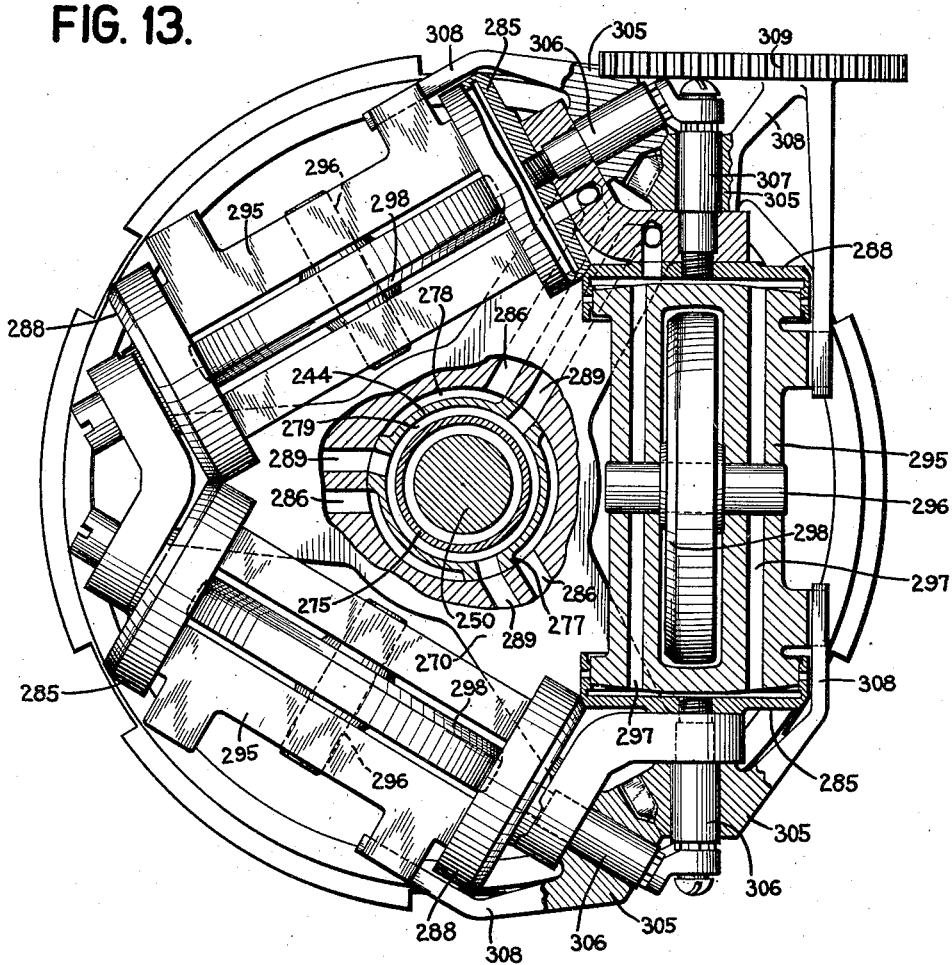
Figure 4:
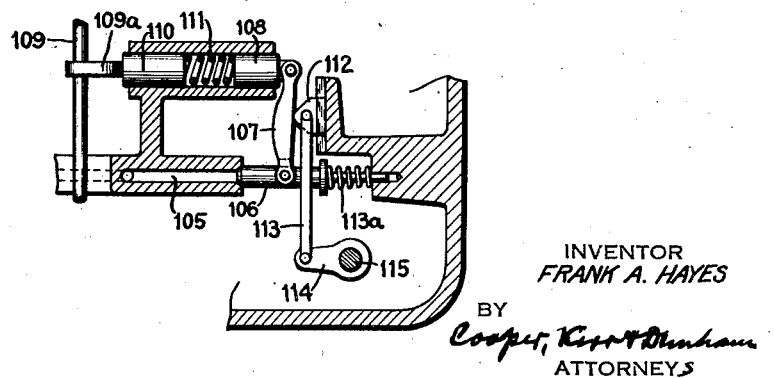

Fig. 4, on the same sheet as Fig. 13, illustrates a further modification of the hydraulic control means of Figs. 1 and 2, showing the torque-control mechanism.

Figure 5:
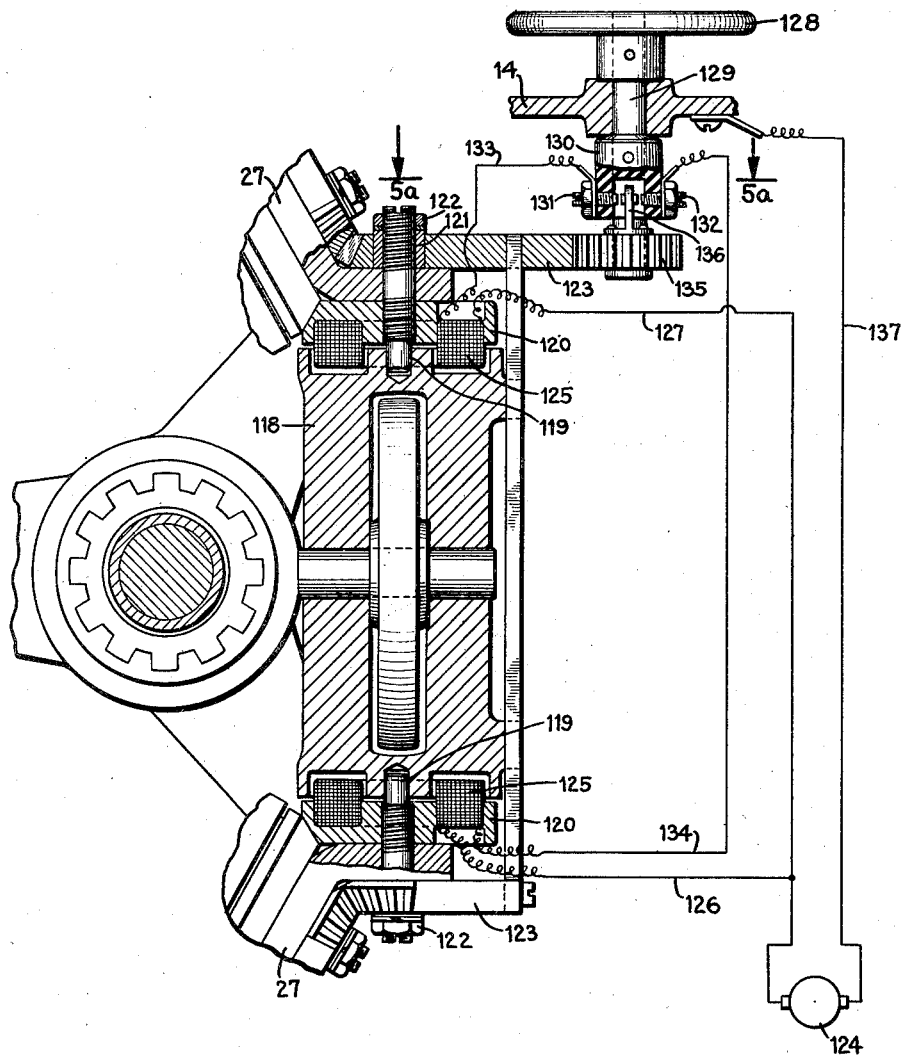

Fig. 5 is a fragmentary cross section of a roller carrier and its supporting spider showing electromagnetic control means.

Figure 5A:
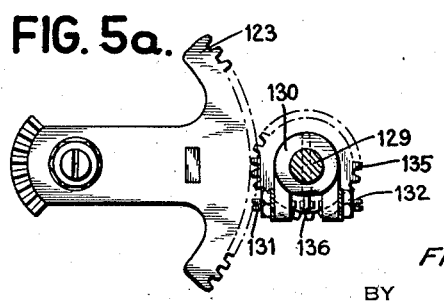

Fig. 5a is a detail sectional plan view on line 5a—5a of Fig. 5.

Fig. 6 is a longitudinal section of a complete transmission showing one embodiment of my invention.

Fig. 7 is a cross section of the transmission shown in Fig. 6, taken through the control mechanism about on line 7—7 but with certain parts displaced to show all of the important parts more clearly.

Fig. 7a is a sectional plan view on line 7a—7a of Fig. 7.

Figure 8:
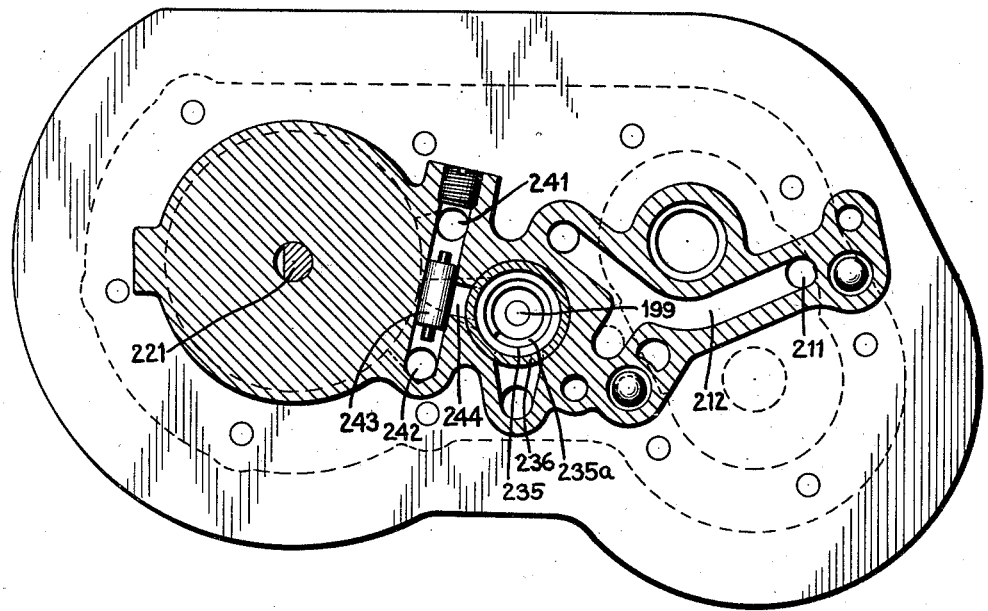

Fig. 8 is a section about on line 8—8 of Fig. 7 but showing the parts (displaced in Fig. 7) in their correct relative positions.

Figure 9:
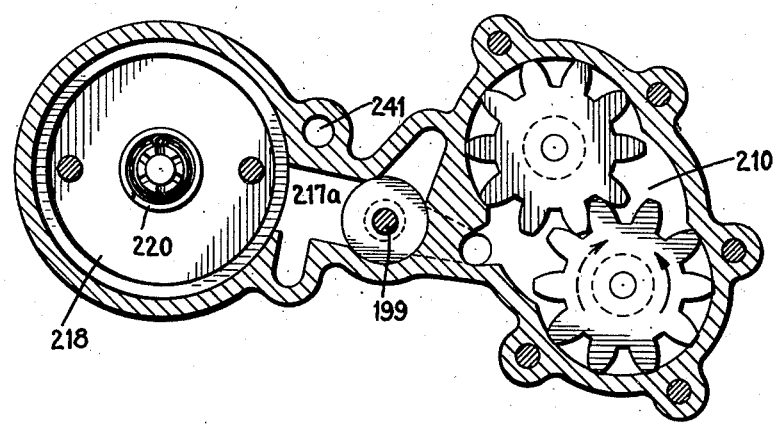

Fig. 9 is a section on line 9—9 of Fig. 7.

Fig. 10 is a cross section of Fig. 6 about on line 10—10 but with the front disk removed.

Fig. 11 is a cross section of Fig. 6, on line 11—11.

Fig. 12 is a longitudinal section showing the disk and roller assembly of a transmission embodying the hydraulic control means of the type shown diagrammatically in Fig. 2, and also showing stop collars against which the beveled edges of the rollers bear in low speed position to provide an "antifriction" low-speed stop.

Fig. 13 is a cross section of Fig. 12 on line 13—13.

Fig. 14 is a cross section of Fig. 12 on line 14—14.

Figs. 15, 16 and 17 show in section various modifications of the carrier-operating cylinders illustrated in Figs. 2, 2a and 12.

Figure 18:
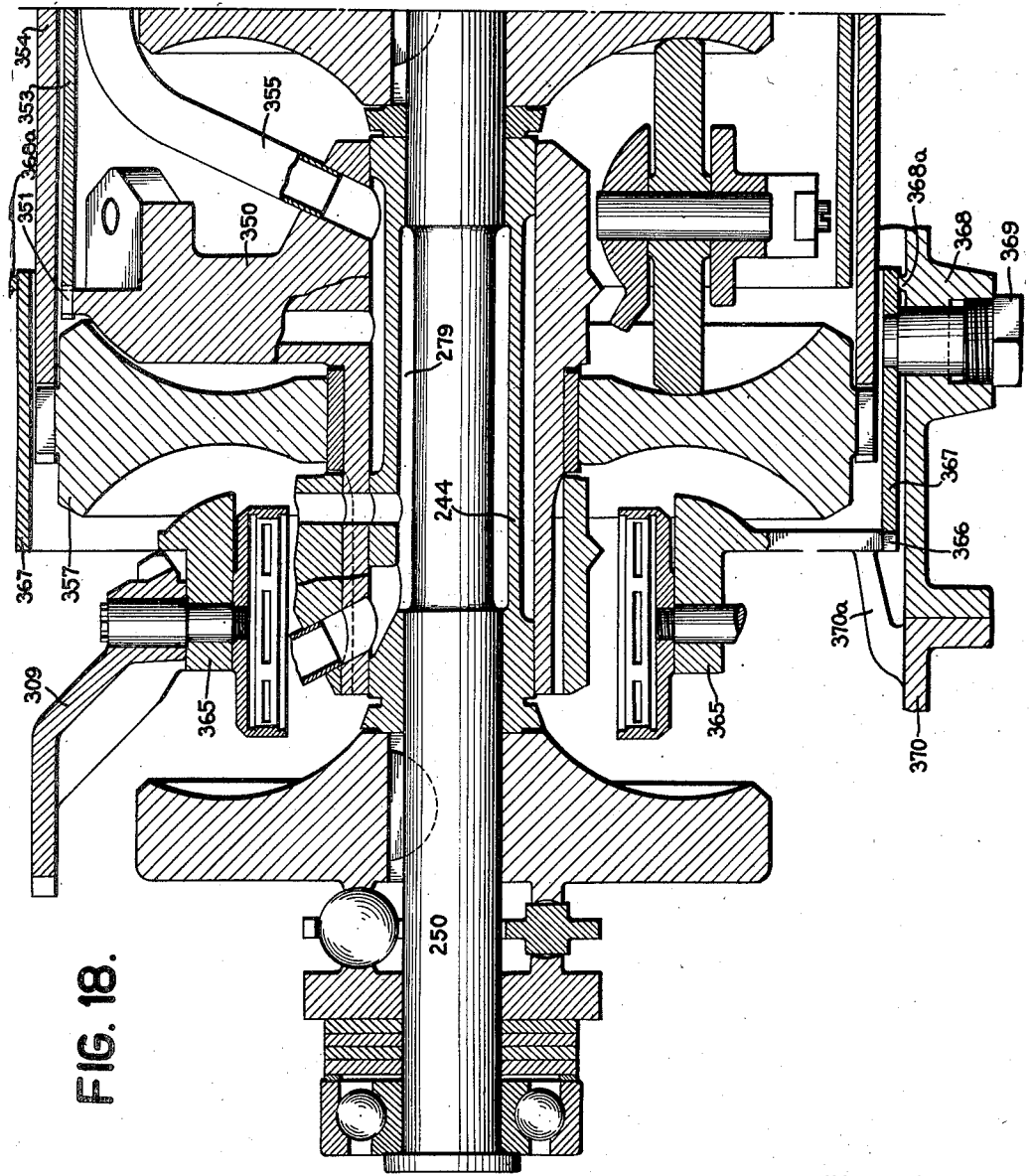
Figure 18A:
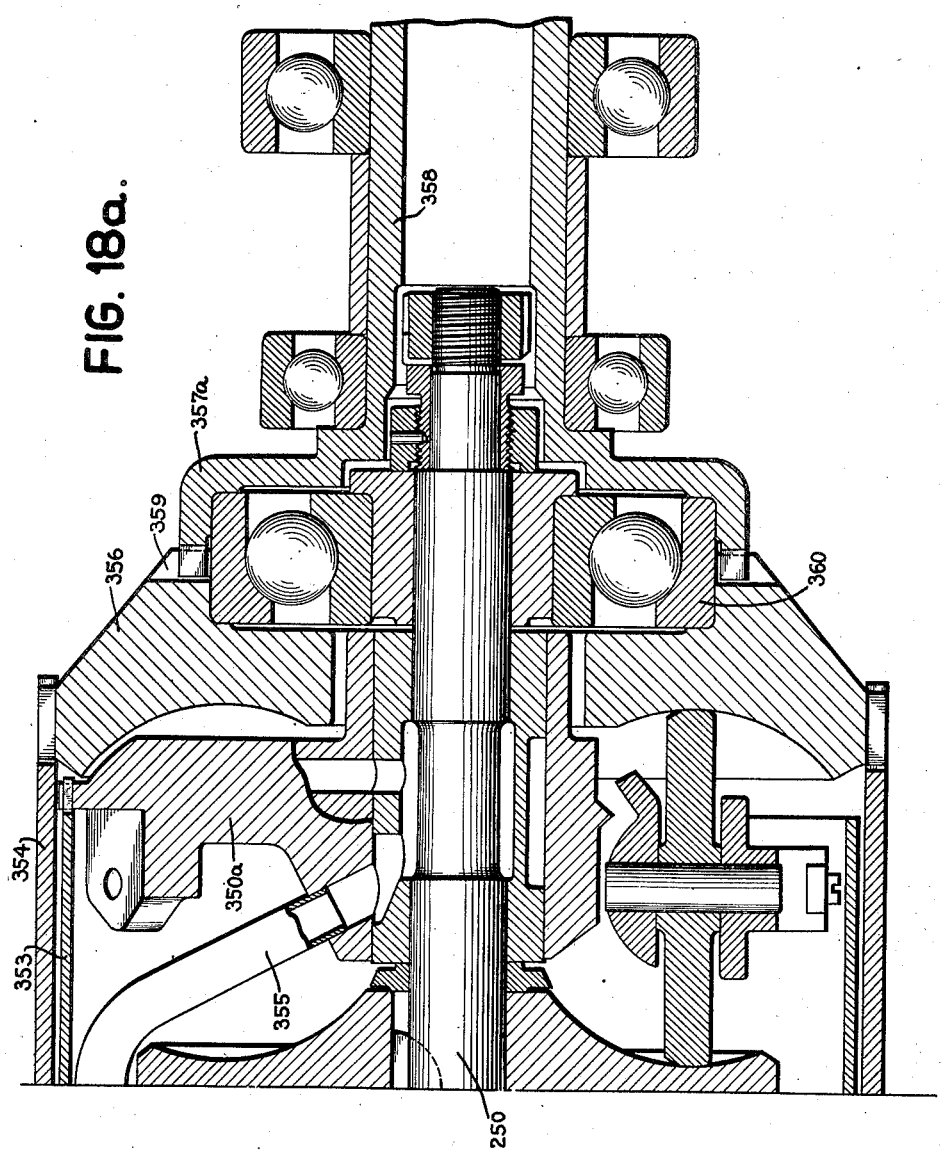

Figs. 18 and 18a show in section the left and right halves of a transmisison having four disks and three sets of rollers, to illustrate the application of the hydraulic control of Fig. 2 to multiple sets. For the sake of clearness the rollers and carriers are omitted, but hydraulic cylinders for initiating precession of a roller of the first set are shown in Fig. 18.

Figure 19:
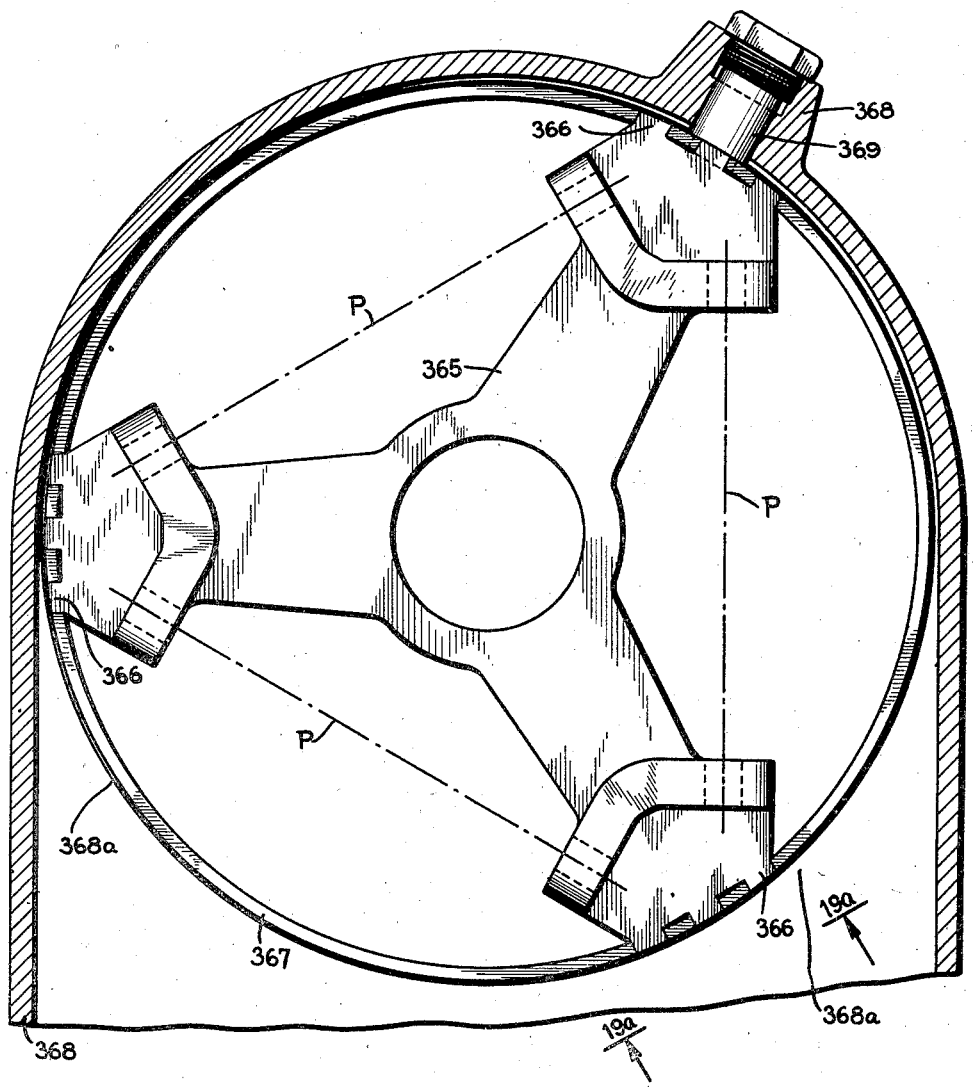

Fig. 19 shows an anchorage (also shown in part section in Fig. 18) for securing the front roller carrier spider to the casing to prevent rotational movement of the spider but permit slight radial adjustment of the spider automatically in any direction to take care of any misalignment and by so doing equalize the pressures between the disks and the several rollers.

Figure 19A:
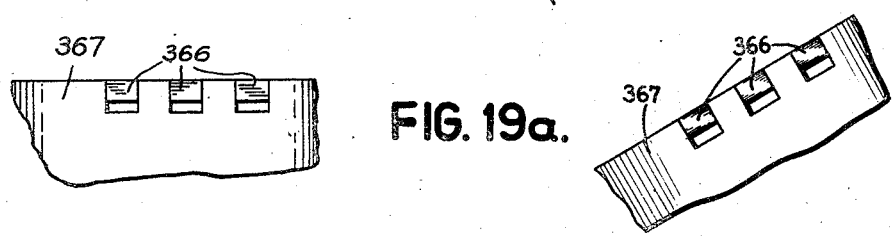

Fig. 19a is a detail view looking from the plane indicated by the line 19a—19a in Fig. 19.

Fig. 20 illustrates somewhat diagrammatically a combined electromagnetic and hydraulic control mechanism and a pre-set spring connection between the control knob and the contacts.

Fig. 20a is an enlarged section of Fig. 20 showing the preset spring and contactor mechanism.

Referring to Fig. 1, 10 is the power input or driving shaft journaled in the casing 11 for connection with any suitable source of power, as for example, an induction motor, not shown. The inner end of the shaft is bell-shaped as indicated at 12 and is provided with teeth or splines for engaging the correspondingly toothed or splined pressure device cam 13. Between cam 13 and the similar cam 14 formed on the hub of the front disk 15 are the pressure device balls, one of which is shown at 13a. Disk 15 is keyed or splined on shaft 16 and is thus free to slide on the shaft but constrained to rotate with it. At the other end of shaft 16, within a casing 18, is a disk 19 similar to disk 15 but fixed to shaft 16. An adjustable collar 20 on shaft 16 takes the thrust of cam 13 through the ball bearing 21. Shaft 10 therefore not only rotates shaft 16 with its associated disks 15 and 19, but also, through the balls 13a and cooperating cam surfaces, provides the necessary pressure to the friction surfaces of the disks and rollers to prevent slipping. The drive is taken through disks 15 and 19, and the cooperating rollers, to middle disk 22. The later is provided with teeth 23 which engage notches in casing 18 and the drive is taken thence through the casing to output shaft 24 on which the casing is fixed. The construction so far described is disclosed in my British Patent No. 391,149. Roller 25 is shown as mounted in a carrier 26 so as to be free to rotate therein about its own axis. Carrier 26 is mounted in supporting member 27 so as to be free to rock or precess on an axis which is a diameter of the roller and also free to move longitudinally of this axis. This longitudinal movement of the roller and carrier causes the roller to precess to different speed-ratio positions, as fully explained in my United States Patent No. 1,698,229. It is to be understood that the other rollers of the set are similarly mounted but for the sake of clearness the parts are not shown in the figure.

Fixed to the carrier 26 is a shaft 30, also journaled in casing 11. Shaft 30 has fixed to it a toothed quadrant 31 which meshes with a gear 32 fixed to a control shaft 33. Also fixed to shaft 30 are two collars 34, which engage between them one end of a lever 35 fulcrumed on a stud 36 fixed to casing 11. The other end of the lever engages a recess in shaft 37 to which is attached piston 38 movable axially in cylinder 39. From the above it will be seen that movement of piston 39 up or down in its cylinder causes carrier 26 to move in the opposite direction and brings the axis of roller 25 below or above the axis of the disks. This displacement of the roller causes it to precess toward some other speed-ratio position.

Pinned to the upper end of control shaft 33 is an arm member 40 which is piloted on the lower end of index shaft 41. The latter is mounted in the casing 11 and has fixed to it, outside of the casing, a control knob 42 and pointer 43. The top of the casing may be graduated in any suitable way (not shown) to indicate the speed-setting of shaft 33. Also fixed to shaft 41 is a cam 44 provided with a cam groove 45 engaged by pin 40a on arm 40.

Any suitable pump, for example the gear pump 46, may be used to supply fluid under pressure for the hydraulic control. This pump may be driven in any convenient way but in such manner as to reverse its direction of rotation when that of the shafts is reversed. It is preferably driven from shaft 10, as by gearing indicated at 47.

Casing 11 is partly filled with any suitable fluid, preferably oil, which is drawn up through suction duct 50 past check valve 51 by pump 46 to duct 52 leading to the top of cylinder 39 and cylinder 53, and thence through duct 54 and annular space 55 around shaft 33. The lower end of shaft 33 acts as a valve to open port 56 and so allow the fluid supplied by the pump to return to the casing. Means may be provided to prevent excessive pressure when port 56 is closed, preferably a by-pass duct 57 (at the left of cylinder 39) of suitable size to give the required maximum pressure at normal input speed or pump speed. An advantage of such a duct is that when the source of power is shut off and the speed decreases, the pressure falls off very rapidly, thus allowing the rollers to change to low speed position under the influence of the load. Duct 57 may be provided with an adjustable orifice to vary the capacity of the duct. One method for such adjustment is shown in Fig. 3, described hereinafter.

Under normal operating conditions at a fixed speed-ratio setting, with the direction of rotation for shafts 10 and 24 and pump 46 as indicated by the arrows, it will be seen that there is a downward reaction on carrier 26 (as indicated by the arrow of the roller journal) which produces an upward thrust on piston 38. The corresponding normal position of the pin 40a in cam groove 45 is in the sloping part of the groove at a point which holds shaft 33 raised to a position which opens orifice 56 just sufficiently to reduce the oil pressure on piston 38 to the point where it balances the load reaction.

Suppose now, with the device operating as described above (in which the cam 44 is turned so that the pin 40a on arm 40 is in the inclined part of the groove 45 and shaft 33 is raised so that oil can escape through port 56), the operator suddenly shifts the knob clockwise (as viewed from above) into, say, the position shown in the figure so as to increase the output speed. This cams shaft 33 downwardly and thus closes port 56, thereby causing full pressure to be developed on piston 38. The latter is thus forced down, raising roller carrier 26 above its equilibrium position (in which the roller axis intersects the disk axis), with the result that the carrier and roller precess counter-clockwise as seen from above. But this precession, through quadrant 31 and gear 32, causes shaft 33 and arm 40 to turn clockwise, so that the pin 40a catches up with its former position in the inclined part of the cam groove and thus raises shaft 33, which opens port 56 and allows the load reaction to bring the roller back (downwardly) to equilibrium position and then reestablish a balance of hydraulic pressure and load reaction at the new speed ratio. Owing to the pressure limiting feature of duct 57 it will be seen that the load can never rise above the value determined by the capacity of the duct and hence no matter how rapidly the change of knob 42 is made no damage can be done to the transmission or its connected parts. Also whenever an overload occurs which would require an oil pressure greater than that for which the relief duct is set the rollers will be pulled down by the load-reaction and the transmission will thereupon change to a lower speed-ratio thus increasing the output torque and reducing the output speed to take care of the overload. For changes to a lower speed port 56 may be opened wide, thus reducing the pressure to 0 and allowing the load to quickly decrease the speed ratio. Of course index shaft 41 is mounted in such manner that more force is required to turn it than can be exerted by the arm 40 as it is turned by the precessing rollers.

It will be seen that when the rotation of shaft 10 is reversed, duct 50 is closed at the top by check valve 51 and check valve 58 opens the duct through which oil is then taken by the pump 46.

All the reactions are then reversed, including the load reaction. In such case, however, the oil pressure in duct 59 acting now on the bottom of piston 38 and also on the bottom of transfer valve 53a raises the latter, thus closing passage 52 at the right of cylinder 39 and opening passage 59 to port 56.

It will be seen from the foregoing that the control is reversible and can be instantly set to obtain any desired speed-ratio without damage, and that it at all times protects the transmission mechanism against injury by overload.

The operation of the control illustrated in Fig. 1 can be briefly described as follows: The adjustment of cam 44 (by knob 42), acting through the arm 40 and shaft 33 controls the escape of oil through port 56 which is governed by the lower end of the shaft and thus controls the movement of the piston 38 by controlling the two forces acting on it, namely, the oil pressure tending to depress the piston and thereby raise the roller 25 through the medium of lever 35 and shaft 30, and the load reaction tending to shift the roller downwardly, as indicated by the arrow at the journal of the roller. With the shaft 10 rotating in the direction of its arrow the oil pressure is on top of the piston and depression of the piston by such pressure causes the roller to precess to a higher speed-ratio. On the other hand, with the shaft 10 rotating in the direction opposite to that indicated by the arrow the oil pressure is exerted on the bottom of the piston and it is the lowering of the roller by the upward movement of the piston that causes precession to a higher speed-ratio. The load-reaction then tends to raise the roller, such movement of the latter causing it to precess to a lower speed-ratio position. As before stated, in normal operation the shaft 33 and arm 40 are in such position that the pin on the latter is at such point in the inclined part of the cam groove 45 that the port 56 is opened (by the lower end of shaft 33) just enough to give an oil pressure which balances (equals) the load-reaction. If, then, with shaft 10 rotating in the direction of the arrow, the load is increased, the roller is depressed and precesses toward a lower speed-ratio position, raising piston 38 against the existing oil pressure on top of the piston. As the roller precesses the gear sector 31 and gear 32 rotate shaft 33 in the direction opposite to that indicated by the arrow on the shaft, thus turning arm 40 in the same direction and carrying its pin down the inclined part of the cam groove. This movement of the pin and arm depresses shaft 33, thereby restricting port 56, and this movement continues until the lessened escape of oil through the port builds the oil pressure up to a value at which the opposing forces are again in balance and the roller is restored to equilibrium position, in which the roller axis intersects the axis of the disks. If, now, the load is decreased the piston is depressed, the roller is raised above the equilibrium position and precesses toward a higher speed-ratio until the pin 40a on arm 40 (moving in the direction of the arrow on shaft 33), is carried up the inclined part of the cam groove to the point at which the consequent opening of port 56 reduces the oil pressure on the piston enough to balance the load-reaction.

It will be observed that for a given load, the position of the inclined part of the cam groove 45 as adjusted by the knob 42 determines the speed-ratio for that load, and that the adjustment may be made while the transmission mechanism is operating or not operating. In the first case (unless the knob is turned very rapidly) the resulting precession may follow the movement of the knob without any sensible interval. For instance, as the knob is turned clockwise (as seen from above) from a position in which the pin 40a on arm 40 is in the inclined part of the cam slot the movement of arm 40 (imparted by the precessing roller through the instrumentality of gears 31, 32, and shaft 30) may keep pace with the knob, causing no change in the capacity of port 56, until a speed-ratio position is reached at which the increasing load-reaction balances the oil pressure. If at this point the operator ceases to turn the knob, precession ceases. If the operator continues to turn the knob, the increasing load-reaction overcomes the oil pressure, and the resulting precession toward a lower speed-ratio causes the arm to run behind the cam, thereby closing port 56 and increasing the oil pressure on the piston correspondingly.

Referring now to Figs. 2 and 2a: In the form of my invention illustrated in these figures, instead of operating the carriers by mechanical connection with a remote hydraulically actuated piston as in Fig. 1, each carrier is formed with pistons 62, 63 on its ends, which fit in cylinders 64 and 65 respectively, which are in turn fastened to supporting member 27. Leading from these cylinders are ducts 66 and 67 which communicate with valve casing 68. This casing is provided with a straight-through bore in which the slide valve 69 can rotate and also move axially. Valve 69 is of the piston type, having four pistons forming three annular spaces, and is similar to the well known piston type of steam engine slide valve. Valve 69 moves with the axially movable control shaft 30a (corresponding in function to shaft 33, Fig. 1), but instead of being directly attached to the shaft it is preferably connected as follows, for reasons given later: the lower end of shaft 30a is made bell-shaped and is guided in casing 68. Inside the bell is a spring 70 which tends to move the valve downwardly. The lower end of the shaft also has a hole to loosely receive the stem of a piston valve 71, the stem being secured to the shaft by a loosely fitting pin 72 extending into a slot in the shaft. During normal operation oil pressure from the duct 78 acting on the lower end of valve 69 keeps spring 70 compressed and the valve up against the lower end of the shaft so that it will move up and down with the latter.

It will be seen that the inclined portion of the index cam-groove 45a in Fig. 2 is "opposite hand" to that in Fig. 1. It is made so merely for convenience in arranging the oil connections in relation to the use of balancing piston 71, to be described later. In Fig. 2, therefore, the valve and shaft are in their upper positions for change to a higher speed-ratio, instead of in the lower position as in Fig. 1. It will be seen that in the upper position (Fig. 2) port 73 of passage 74 is connected to duct 67 and supplies oil under pressure to the lower carrier-operating cylinder 65, thus balancing the downward reaction of the load on the carrier. At the same time the valve connects passage 66, leading to the upper cylinder 64, to port 75 of suction duct 76. The normal operating position of the valve is below that shown, and is where it is starting to connect port 73 to passage 67 with an opening just sufficient to provide the pressure needed to balance the load reaction and at the same time supply enough oil to compensate for leakage in the system beyond the valve. In Fig. 2 the control cam has just been shifted to a higher speed setting, with the result that piston valve 69 is raised to its upper limit, thus applying full pressure to the bottom of the carrier and raising the roller above its equilibrium position, thereby causing it to precess to a higher speed-ratio position, which causes arm 40 (turning clockwise as seen from above) to catch up with the sloping portion of the cam groove 45a and return the valve to its above-described normal operating position.

Further operation of the construction shown in Fig. 2 is the same as that of Fig. 1, except as follows:

It will be seen that when valve 69 is brought down below its above-described normal operating position (which is the same for either direction of rotation) pressure duct 74 (for clockwise rotation) is connected to pipe 66 through port 77. This condition might occur on a quick movement of the control cam to a lower speed position and will provide for a positive change to low speed regardless of the load, whereas with the construction shown in Fig. 1 change to lower speed is always dependent on the load. Also the construction of Fig. 2 takes care of any reversal of torque through the transmission and thus permits it to be driven from either end, whereas with the construction of Fig. 1 if the transmission is driven from the output end without change in the direction of rotation of the pump, the control cam becomes ineffective and the transmission will operate at one extreme speed-ratio only. A further purpose of the double acting valve 69 is to facilitate change down on stopping. If spring 70 is made weaker (preferably only slightly weaker, by a predetermined amount) than the upward force exerted on the valve by the oil pressure from duct 78 at normal input speed as governed by by-pass duct 57, then regardless of what the control setting happens to be when the input power is shut off and the speed of the pump decreases very slightly, spring 70 will overbalance the oil pressure on the bottom of valve 69 and the latter will descend, thus reversing the direction of the hydraulic pressure on the carriers causing a positive change to low speed-ratio position. For example, with the valve 69 in the position shown in Fig. 2, duct 74 (assumed to be the high pressure duct) is connected through passage 73 to pipe 67 so that the pressure tends to shift the carrier in a direction which would cause precession to a higher speed-ratio. At the same time the low pressure duct 76 communicates with pipe 66 through passage 75. If, then, by decrease of pump speed the oil pressure is reduced to a value less than the tension of spring 70 the latter depresses the valve, thereby connecting pressure duct 74 through passage 77 to pipe 66 and shifting the carrier in the direction which causes it to precess to the lowest speed-ratio. The descent of the valve also connects the low pressure duct 76 to pipe 67 through passage 75. It will be observed that in this embodiment of the invention the operation described is independent of the control setting and depends only upon the speed of the power input shaft 10 from which the pump is driven.

In Fig. 2 it will be seen that the maximum upward movement of the carrier can be limited or adjusted by means of the screw 79, which also serves to secure the upper cylinder 64 to the support 27 by means of the clamp nut 80. Fig. 2a shows alternative means for adjusting the limit of carrier movement (downward in the figure), which means may be used with any carrier driving a quadrant or gear segment as in Fig. 2. Such gear 81, Fig. 2a, is driven outside of the supporting member 27 by a drive bar 82 connected in such manner to the gear and to a boss on an arm on the carrier 83 (as by fixing the bar to the gear making it slidable in the boss) as to permit free movement of the carrier along the precession axis. The gear has a hub 84 which rotates about the fixed cylindrical extension of nut 85. This nut is arranged to clamp the carrier-operating cylinder to support 27 without binding the gear hub. Adjusting screw 86 is used to limit the downward travel of the carrier.

It is to be understood that in practice the ducts 66 and 67 are connected to all the carrier cylinders in the transmission mechanism, and for the direction of rotation indicated by the arrow on shaft 10 in Fig. 2 duct 66 would be connected to the cylinders at the leading ends of all carriers and 67 to the cylinders at the trailing ends. Such a system provides a perfect automatic equalization of load on all carriers without complicated mechanical equalizing means, and thus provides a marked advantage in the direction of simplifying and reducing the cost of the transmission mechanism.

It will be seen that as the control cam is rotated, only the inclined portion of the groove can adjust the control valve 40 or 69, Figs. 1 and 2 respectively. As soon as rotation of the cam relatively to the pin on arm 40 carries the inclined portion of the groove out of engagement with the pin and brings one or the other non-inclined portion into engagement with the pin, movement of the valve in the opening or closing direction, as the case may be, ceases, and precession then continues at a rate, i. e., angular speed, independent of the extent of rotation of the cam, until the valve-actuating shaft, 30 or 30a, rotated by the precessing roller through the instrumentality of gears 30—32, in the same direction as that in which the cam had been rotated, catches up, so to speak, with the cam and carries the pin again into the inclined part of the groove, thereby reversely adjusting the valve and thus causing precession to cease when by this reverse adjustment the escape of pressure fluid past the valve and the consequent change of the fluid pressure effective on the carrier permit the roller to return to equilibrium position. It will also be observed that the adjustment of the speed-ratio control mechanism to cause change of speed ratio can be made while the transmission is running and that such adjustment may be to the full extent of either non-inclined portion of the groove.

Where the driving means is a variable speed motor providing constant or relatively constant torque, such as a gasoline engine or any device offering a wide variation of speed with normal torque variation, automatic variation of speed ratio based on torque is not very satisfactory unless the input device is supplied with a governor. On the other hand it is quite practicable and for many applications desirable to make the transmission mechanism itself, within its speed ratio range, act as a governor for such an input device by changing the speed-ratio in response to slight variations in input speed, so as to keep the load on the input device such as will give the desired speed regulation. The usual requirement is constant input speed in order to obtain maximum input horsepower. In my United States Patent #1,865,102 I show and describe means for accomplishing this result, consisting of a pump operating at input speed and an adjustable by-pass. But this was described in connection with a non-reversible speed-ratio control mechanism in which the fluid pressure piston assumed progressive positions with changes of speed-ratio, and variations in the required control load for constant input torque could be compensated by a spring so as to give operation over the full range at substantially constant fluid pressure. With the reversible control means of the present invention the condition of progressive movement of the hydraulic control piston with change in ratio is not present and hence means should be provided to vary the hydraulic pressure to suit the control reaction for constant input speed and torque. Means for accomplishing this result is shown in Fig. 3, and for convenience it is shown as an addition to the control of Fig. 1, it being understood that the control cam 44 would in this case be set at the highest ratio position if automatic action over the full range is desired, the action being automatic up to the setting of the knob. Of course manual control can be eliminated altogether.

Referring to Fig. 3 (on the same sheet of drawings as Fig. 14): On the control shaft 33 is mounted a cam 88 which actuates a needle valve 89 against a spring 90. This needle valve 89 serves to restrict more or less an orifice 91 in an adjustable valve body 92 connected through ducts 93 and 52 with the pressure side of the pump 46. In the casing 94 of the valve body is a vent 95. The construction just described provides a variable by-pass which changes its aperture in a predetermined relation to the speed-ratio position of the rollers, said relation being determined by the shape of the cam 88. Valve body 92 is made slidable in its casing 94 but is restrained from rotation by pin 94a, and hence the aperture can be further regulated by hand if desired, by means of screw 96 and knob 97, or this adjustment may be connected with the engine throttle to vary the speed ratio in accordance with throttle position as well as ratio. With this latter connection in an automobile the valve body could be positioned for maximum power operation at full throttle and arranged to reduce the engine speed by a rightward movement at light throttle.

Fig. 4 (on the same sheet of drawings as Fig. 13) shows mechanism for controlling the form and magnitude of the torque characteristic, the mechanism being usable with both Figs. 1 and 2. Duct 105 is connected to (say) duct 54 of Fig. 1 or 78 of Fig. 2, and therefore carries pressure regardless of the direction of rotation. Duct 105 leads to a relief valve 106. Pressure to keep valve 106 closed is supplied by a lever 107 having one end pinned to the valve and the other bearing on spring plunger 108. On any shaft, as 109, connected to move in response to change in ratio, for example shaft 30 or 33 of Fig. 1 or shaft 30a of Fig. 2, is a cam 109a, against which presses a cam follower 110. Between the latter and plunger 108 is a spring 111. Beam or lever 107 works on an adjustable fulcrum 112. Relief valve 106 thus governs the maximum hydraulic pressure in the system, which pressure is in turn proportional to the maximum reaction torque. Hence by suitable design of cam 109 any desired torque characteristic within the speed-ratio range may be obtained, and by adjusting fulcrum 112 the magnitude of this torque characteristic may be changed without altering its form. For the purpose of adjusting the fulcrum it may be connected by a link 113 to an arm 114 on a rock shaft 115 extending outside of the casing and provided with an actuating knob, not shown. If the fluid pressure control piston, say piston 38 of Fig. 1, has a spring (not shown) to urge it toward the low speed ratio position the effect of such spring may be compensated for, wholly or partially, by a spring 113a of suitable tension, tending to close valve 106 on its seat at the orifice of duct 105.

Figs. 5 and 5a show electromagnetic means for operating the carriers in place of the hydraulic means shown in Fig. 2. In Fig. 5 the carrier 118 is made of magnetic metal and is supported to precess on the ends of screws 119 which are also adjustable to limit the axial movement of the carrier. Steel cores 120 are secured to supporting member 27 by screws 119 and bushing or nut 121 which is castellated at its upper end and about which the quadrant and bevel gear sectors 123 turn. 122 is a lock nut. 124 represents a source of current for energizing the coils 125 carried by the cores 120. One side of the source is connected by leads 126, 127 to one end of each of the magnet coils 125. The operating knob 128 is secured to shaft 129 which has secured to its lower end, inside the casing 14, a yoke 130 made of suitable insulating material and provided with arms extending radially outward from the shaft, in the extremities of which arms are contact screws 131 and 132. Lock nuts on these screws also serve to secure terminals which are connected by flexible leads to the wires 133 and 134 leading to the free ends of the respective magnet coils. Free to rotate on the lower end of shaft 129 is a gear 135 driven by the roller carriers through the sector gear 123 and provided near its edge with a contact arm 136 which extends between the contact screws 131, 132 and is grounded through the shaft 129, casing 14 and lead 137 to the other side of the source 124. The operation of this construction will be readily understood from the foregoing. When knob 128 is turned to change the speed ratio it closes the circuit through contact 131 or 132 as the case may be, thereby energizing the proper magnet to shift the roller carrier in one direction or the other (up or down in Fig. 5), which in turn causes the roller to precess in such a way as to cause gear 135 to follow the movement of the control knob. When equilibrium is established there will usually be a continual make and break at the contact points unless the magnetic pull just balances the load, but such movement will involve only a very minute movement of the rollers. Yoke 130 may be connected to knob 128 by a preset spring arrangement to permit the knob to turn without turning the yoke further than to make contact. Condensers may be used across the spark gaps or variable resistance such as a carbon pile or rheostat coil used in place of the make and break mechanism. The magnet poles may be laminated for A. C. or any other well known devices for improving electrical circuits used without departing from my invention. To make this control reversible it will be necessary to reverse the connections of 75 and 76 to the coils, but this may be done by a commutator or other form of reversing switch connected by a light slipping clutch to the input or output shaft.

Figs. 6 to 12 show a transmission embodying one form of my invention having a control similar to that described in connection with Fig. 1.

Fig. 6 shows the apparatus in longitudinal section. The drive is taken from input shaft 150 to pressure cam 151 and through balls 152 to disk 153 and thence to shaft 154 and disk 155. From the driving disks 154, 155 the drive is through two sets of three rollers each, to middle disk 156 and thence from bell-shaped casing 157 to output shaft 158. A diaphragm 159, cut out to permit the rollers to operate, has a hub 160 on which is keyed a crank member 161 consisting of a single arm and hub. Member 161 takes the torque reaction from both sets of rollers through an articulated connection (tongue and groove) of its arm with an equalizing crank member 162 (see also Fig. 11), and through its keyed connection to diaphragm 159 which is bolted between halves of the transmission housing. The hub 160 of diaphragm 159 is bored out to receive the hubs 163, 164 of the front and rear roller-supporting spiders, which are splined together and are capable of slight rotary movement in hub 160. The hub of spider 164 extends nearly the full distance between the driving disks 153, 155, but is bored out to form a hollow shaft clear of shaft 154. On the ends of this hollow shaft are spherical bosses on which are mounted the front and rear control spiders 165 and 166 respectively. The control spiders, as clearly shown in Figs. 10 and 11, have three short arms 165a, 166a for operating the roller carriers 167, 168. These arms have ball shaped ends which fit in arcuate grooves in the carriers. It will be seen that when a control spider is rocked about the disk axis the carriers and rollers associated with the spider will be given a movement of translation along their axes of precession, thus causing the rollers to precess, the precessional movement being permitted by the curvature of the slots by which the arms of the spider engage the carriers. Preferably these slots are located at the transverse central planes of the carriers, as shown in Figs. 10 and 11. Each control spider also has a long arm. The long arm 169 of the front control spider is connected by a link 170 to the hydraulic control piston as shown in Figs. 7 and 10, by a ball and hole joint in the upper end of the connecting link. This arm and its spider can therefore have no movement of rotation about the disk axis except with the piston but otherwise they are free to move slightly in every direction. The long arm 171 of the rear control spider 166 is connected to the crank 162 by a tongue-and-groove or gear-tooth connection 172, Fig. 11, by which it is restricted in its movement about the shaft axis but is free to slide back and forth in the slot and also to turn slightly due to the rounding of the tooth and the clearance between the latter and the surfaces of the slot, as shown in Fig. 11. The ends of the long arms where the control load is applied are normally in the same across planes as the centers of the spherical supports on which the spiders are mounted on hub 164, Fig. 6, but these planes are spaced from the planes of the roller centers so that the spiders can "wobble" about the spherical supports and thus give to the three short arms the effect of an eccentrically movable equalizing member for the purpose of equalizing the load among the rollers of a set. This method of equalization is an embodiment of an invention clearly shown and described in my United States Patent No. 1,865,102. Crank member 162 is journaled by a needle bearing in an arm 173 of the rear roller supporting spider 164. The radii of its arms connecting with arms 161, 171 are so proportioned that it acts on the balance or scale principle to divide the load equally between the two sets of rollers. This method of equalization is also an embodiment of an invention fully described and shown in my United States Patent No. 1,865,102, above mentioned, but in the specific embodiment illustrated in the patent three bell cranks or rockers are employed. Also it should be pointed out that the method herein illustrated and described for equalization between sets is independent of the type of control used on the front set of rollers, and the control means of the front set can therefore be entirely different from that of the rear set without affecting the equalization between sets. This is an important feature, as it might in some instances be desirable to use a front set control which is not torque responsive, such as the control shown in Fig. 6 of my United States Patent No. 1,919,218, or one that has a relatively slight torque response as shown in Fig. 5 of that patent. One important advantage of such a change would be the cutting down of the control energy and hence the size and/or pressure used in the hydraulic control cylinder.

Fig. 11 shows, also, three alternative methods of mounting the rollers in their carriers, i. e., with a plain bearing as at 180, a single ball-bearing as at 181, or a double ball-bearing as at 182. Needle bearings are advantageous where the bearing pressures are heavy but in most cases ball-bearings or plain bearings are satisfactory.

Referring to Fig. 10, it will be seen that the carriers 167 are pivoted in the supporting spider 169 by short pins 185, 186, 187, the inner ends of which are squared to fit into the ends of the carriers. To the outer ends of pins 185 and 186 are secured bevel-gear sectors 188, thus gearing the carriers together but with enough backlash to permit equalization of the rollers.

One of the front carriers (the upper carrier in Fig. 10) has attached to an extension of one of the journals of its rollers a crank arm 189 connected by a ball and socket joint to a link 190 for connection to the control arm member (described below), so that through the bevel gear connection between carriers the combined precession energy of all three front rollers is available to actuate the control mechanism. The flexible tubes 191 are provided to carry lubricating oil to the various bearings.

Referring now to Figs. 6, 7, 7a, 8 and 9, the control mechanism shown in these figures embodies the principle of the mechanism shown diagrammatically in Figs. 1 and 2. Link 190 is connected by ball and socket joint to an arm or crank member 195 having a pin 196 engaging cam groove 197 of cam 198. Cam 198 is rocked, together with shaft 199 to which it is secured by a set screw, by means of a pinion 200 meshing with teeth on the inside of the cam. The pinion is fixed on the end of shaft 201 of the control knob 202 which also rotates the graduated dial 203 past a window 204 in the cover 205 to show the speed-ratio setting. The cover is held in place by a screw 206 which also closes the hole forming the bearing for the upper end of shaft 199. Shaft 199 passes through the tubular stem 207 on which arm 195 is mounted.

Referring to Figs. 6, 7, 8, and 9, gear pump 210, corresponding to pump 46 of Figs. 1 and 2, pumps oil through ducts 211 and 212, to ducts 213 and 214, which latter two correspond to ducts 77 and 73 of Fig. 2. Suppose now that cam 198 is turned counterclockwise (looking from above) for a shift to higher speed-ratio. This brings pin 196 down still farther toward the bottom of the inclined portion of cam groove 197 and by thus depressing stem 207 moves the control valve down, opening port 214 to duct 217 and thus supplying oil to the top of control piston 218, which corresponds to 38 of Fig. 1. The resulting downward movement of piston 218 shifts the rollers for precession, thus moving the rollers to a higher speed-ratio. At the same time pistons 219 and 219a are raised, thus compressing spring 220 and raising stub shaft 221 until the ball-detent 222 engages the end of 221 and prevents it from moving down again unless a load greater than the tension of spring 220 is applied to it. Henceforth, unless the direction of rotation of the transmission is reversed, or a heavy reversal in torque occurs from some other cause, the control piston assembly 218, 219, 219a will stay in the position described and thus provide the tension of spring 220 tending to return the transmission to low speed position. If the direction of rotation is reversed, however, oil under pressure will enter the duct 217a and the piston assembly 219, 219a will be forced down, compressing spring 223 and depressing stub shaft 221 until the ball-check 222 snaps into the notch.

Referring now to the needle valve 227, Fig. 7: This is shown screwed into the valve casing and operated by gear 228 rotated by gear 229 fixed on stem 207. It will be seen that the thread on this needle valve is left hand. Bearing in mind that for change to a higher speed-ratio (where less pressure is required to balance a given torque than at the lower ratio) arm 195 moves counterclockwise, it will be seen that the needle valve 227 will be given a clockwise movement which will unscrew it, thus increasing the size of the by-pass controlled by it and reducing the pressure as desired. This corresponds to the cam operated needle valve 89 of Fig. 3. Corresponding to the duct 57 of Figs. 1 and 2 is a by-pass 230 which may be adjusted by the needle valve 231.

One other feature of Fig. 7 remains to be described, and that is the method of compounding the ratio. Attached to the bottom of shaft 199 is a piston 235 which works in a cylinder 236. Oil from duct 217 or 217a, whichever happens to be the pressure duct, flows through 241 or 242 to transfer valve 243 (see also Fig. 8) similar to valve 53a of Figs. 1 and 2, and thence to port 244 and cylinder 236 above piston 235 tending to force the latter down against the tension of spring 235a. It will thus be seen that the pressure acting on piston 235 is the actual control pressure applied to piston 218 and therefore bears a definite relation to the load; hence the downward movement of piston 235 and with it shaft 199 and cam 198 will be proportional to the load, but this downward movement results in a downward movement of arm 195 and hence valve 240 also, which increases the pressure in duct 217 and hence causes the transmission to go to a still higher speed ratio, i. e., to increase its ratio (preferably slightly) in proportion to load, as determined by the tension of spring 235a. It is thus possible to compensate not only for speed losses under load in the transmission itself but for such losses in the input device.

Figs. 12, 13 and 14 illustrate a transmission mechanism which is adapted to the control shown in Fig. 2 and which also has other advantageous features. Mounted on the transmission shaft 250 is the pressure device cam 251 provided with teeth or splines for connection with like parts on the bell-shaped end of a driving shaft like shaft 150 shown in Fig. 6. Between the cam and the shoulder 252 on the end of shaft 250 are four Belleville washer springs 253 and thrust bearing 254. Cam 251 drives front disk 255 through pressure device balls 256 mounted in a cage 257. Disk 255 is keyed to shaft 250 but is free to move axially thereon. At the other end of shaft 250 disk 258 is keyed and bears against an adjustable collar comprising a threaded sleeve 259, nut 260 and pin 261. With nut 260 backed away, sleeve 259 is first pulled up against the shoulder on the shaft by means of nut 262. Nut 260 is next adjusted to give the required initial pressure by deflection of washer springs 253 and is then, together with sleeve 259, drilled for pin 261 which is driven in place, thereby locking the drilled parts together permanently. This insures that whenever the transmission is taken down and reassembled, pulling nut 262 up tight so as to bring sleeve 259 against the shoulder on the shaft will give the correct initial pressure, and play in the pressure device will be secured without further adjustments.

Still referring to Figs. 12, 13 and 14, the drive is transmitted from disks 255, 258 through the two sets of rollers (see Figs. 13 and 14), to middle disk 265. The latter is provided with splines or teeth 266 for connection to a drum similar to 18, Fig. 1, but splined loosely to the output or driven shaft (not shown) to provide a slight amount of universal play, and thus prevent any side thrusts being transmitted to middle disk 265 due to misalignment.

Front roller supporting spider 270, Figs. 12 and 13, is provided with a long hub 271 extending through the middle disk and has pressed on it a bronze bearing sleeve 272 on which the middle disk 265 rotates. On the rightward end of this hub 271 is splined the rear roller supporting spider 273 which is slidable on the splines and also on the enlarged portion of the hub next the bearing sleeve of the middle disk. The leftward end of the hub is bored out to receive bushing 274 which is pressed in place, the bore and bushing being slightly tapered to insure tightness. Sleeve or tube 275, which is reduced in diameter at each end, is also pressed home at the same time as bushing 274 and is a tight fit in the bushing at the leftward end and also in the extreme rightward end of the hub 271 of spider 270. Pressed into the ends of tube 275 are bearings 276 in which shaft 250 rotates. The only bearing of bushing 274 against the inside surface of the bore of the hub 271 of spider 270 is by a narrow annulus or rib at each end and six radially drilled bosses 277. Three of these bosses are shown in Fig. 13 and one of the three in Fig. 12. The other three, at the rightward end of the bushing, are not shown. The remainder of the outside of the bushing 274 is cut away to a smaller diameter thus providing an annular passage 278 between the bushing and hub 271. Similarly the inside of the bushing is bored out to a larger diameter for the main length of it except where it fits over tube 275 at the extreme leftward end, thus forming an annular passage 279 between bushing 274 and tube 275. Passage 278 acts as an oil duct to distribute oil under pressure from the controlled oil supply (corresponding to duct 67 in Fig. 2, represented by tube 280 in Fig. 12) to the various carrier-operating cylinders 285, Figs. 12, 13 and 14, through ducts 286, Figs. 12 and 13. Similarly, passage 279 receives its oil from tube 287 corresponding to duct 66 of Fig. 2 and distributes it to leading cylinders 288 through ducts 289.

Still referring to Figs. 13 and 14, roller carriers 295 are formed with pistons at their two ends which fit their respective cylinders for longitudinal motion and also for rocking with the precession of the rollers. Roller shafts 296 are pressed into the rollers and are a running fit in their carriers. The plain bearings of these shafts in the carriers are conveniently lubricated by oil under pressure direct from the cylinders 285 or 288 as the case may be, through duct 297. The rollers are provided with beveled or conical edges 298, which in the lowest speed-ratio position bear against conical collars 299, Figs. 12 and 14, which rotate (on shaft 250) with the rollers at the same speed. The two cones have a common apex lying on the shaft axis, and hence pure rolling contact results, and thus providing practically frictionless low speed stops for the rollers which prevent any extraneous force (due to friction on the stops) from interfering with the proper functioning of the hydraulic control mechanism when starting up in low speed. To eliminate any side loads on the cylinders at the same time, the rollers are given sufficient end clearance in the carriers to insure that precession reactions will be taken by the torus grooves in the disks when the rollers are against the low speed stops. Stops for the rollers in the highest speed-ratio position may be provided, such, for example, as the stop shown at 299a, in position to be engaged by a finger 299b on the carrier. For the purpose of communicating the precessional movement of the rollers to the control shaft 30a (Figs. 12 and 2) the bevel gear sectors 305 of the front set of rollers, Fig. 13, mounted on the studs 306, 307 which secure certain of the cylinders 285, 288 on the supporting spider 270, are provided with arms 308 extending into recesses in the responsive roller carriers so that as the latter rock with their precessing rollers the gears will be rocked correspondingly. The gear 305 on stud 307 has a gear sector 309, Figs. 12 and 13, meshing with a gear 310 pinned on shaft 30a. It will be recognized that sector 309 and gear 310 correspond to the similar parts numbered 31 and 32, respectively, in Fig. 2.

Fig. 15 illustrates carrier-actuating cylinders made of corrugated copper bellows 315, the cup portions 316 of which are mounted on bushings 317 threaded at their upper ends to receive the screws 318 which serve to limit the axial movement of the carriers. The bushings are held in place in the spider 319 by dowel screw 320 and are counterbored at their inner ends to allow passage of oil between them and the adjusting screws to the cylinders. The cylinder heads or cups 316 are made a running fit on the bushings. The carrier is guided in its axial movements on bushings 317 by bosses 321 which are slotted transversely for flow of oil to the cylinder. In some cases it is desirable to insure that the transmission mechanism will stop in the highest speed-ratio position, or it may be desirable to assist its return to low speed-ratio when stopping, and this may be done by using a spring as in the appropriate end of the cylinder and carrier assembly. Such a spring is shown at 322. Bevel gears 323 are shown, driven by bars 324 fastened to the carrier outside of the spider arms 319 which hold the bushings 317. The gears 323 correspond to the similar gears 305, Figs. 12 and 13, and are for the same purpose as the latter. This bellows arrangement is very advantageous as it can be manufactured at a reasonable cost, eliminates close fitting, wear, and possibility of sticking of the pistons in the cylinders, and greatly reduces the oil leakage factor.

In Figs. 16 and 17 are shown methods of increasing the loads which may be taken by the carriers without increasing the fluid pressure. This is advantageous for many applications where high duty is required, as the diameter of the cylinder which can be used inside the torus is limited for any given size of transmission mechanism.

In Fig. 16 a double piston arrangement is used. The ends of the carrier are provided with bosses 328, on the end of which the pistons 329 are pressed. 330 are diaphragms fixed to the cylinders 331. The carrier itself forms inner pistons. Vents 332 are provided for escape of oil leakage by the outer pistons, and the bosses 328 are provided with central bores and cross connecting holes for feeding oil to the spaces between the diaphragms and the ends of the carrier. Oil is supplied to the cylinders by passages 333 in the supporting spider 334.

In Fig. 17 the carrier is not used as a piston but is merely guided in the lower end of the cylinders 338. The pistons are floating cups 339 the outer edges of which engage the ends of beam members or levers 340, four for each end of the carrier. The cylinder mounting screws 341 provide the fulcrums, and the pressure of the levers is applied to the carrier on annular ridges 342. With this system the pressure effective on the carrier can be multiplied several times.

Figs. 18 and 18a illustrate a transmission mechanism having three sets of rollers in parallel and indicate clearly how the construction can be carried out for any number of sets in parallel.

Fig. 18 is like Fig. 12 except that tube 275 and bearings 276 are eliminated, and annular passage 279 is formed by the space between the shaft 250 and the bushing 244. Spider 350, by which the second set of rollers is supported, is provided with teeth 351 on radial extensions of its three arms, one of which arms is shown in the figure. These teeth are similar to those shown in Fig. 19 described hereinafter, but the arms are radially shorter to take sleeve 353 inside of the drum or casing 354. The sleeve has teeth at both ends, and connects the middle spider 350 to the rear spider 350a by which the third set of rollers is supported. These two spiders are also connected by two oil ducts or tubes 355 for conveying oil from the two sides of the oil control system to the rear or third set of carriers. The end disk 356 is connected to the second disk 357 by the sleeve or drum 354, and the latter is connected to the bell end 357a of the output shaft 358 by teeth or splines 359. With an odd number of sets of rollers, as in Figs. 18, 18a, the thrust of the last disk must be carried to the shaft by a thrust bearing of adequate capacity, as indicated at 360. The bearing shown also serves to support the rear end of shaft 250 in output shaft 358.

The provision of more parallel sets of rollers than the conventional two has notable advantages. It greatly increases the power range, which is at present limited by the difficulty and cost of producing and grinding very large disks. It improves the pressure device since it increases the torque without increasing the load, and it greatly facilitates the manufacture of a line of mechanisms of different capacities and cut down tool costs and replacement supplies since so many of the parts can be made interchangeable. For example, with one size of rollers, carriers, spiders, pressure devices, disks and control parts, all of small size, a number of mechanisms, for example six, can be assembled having from one to six sets of rollers, giving capacities in the ratio of 1, 2, 3, 4, 5, 6 but differing as to size practically only in length.

The use of hydraulic cylinders at the ends of the carriers, as in Figs. 2, 12, 13, 14, 15, 16, and 17, for example, is especially advantageous in a transmission mechanism in which more than two sets of rollers are employed, as it avoids all mechanical means for effecting the precession-initiating translation of the carriers and permits the hydraulic actuating pressure to be transmitted to the successive sets from one end of the series by stationary passages and ducts as, say, in Figs. 18 and 18a. It will be observed (in Fig. 12, for example) that the toric grooves in the disks, for instance the grooves in disks 255, 265, are parts of the surface of a "torus" or ring-shaped "solid" formed by the revolution of a circle about an axis in the plane of, but outside, the circle. It will also be observed in Figs. 12, 13 and 14 that the hydraulic cylinders 285, 288 are wholly within the respective tori. Further, the cylinders are substantially wholly within the toric grooves themselves. These features are advantageous as conducive to compactness of the transmission mechanism. Effecting the translational movement of the carriers by means wholly hydraulic and actuated by pressure from a common source of pressure has the advantage of making it possible to eliminate all mechanical equalizing devices, thus greatly simplifying the mechanism. It will be observed in Figs. 18, 18a, that the first and third disks (counting from the left) constitute a set keyed to shaft 250 so that the set of disks and the shaft rotate as a unit, and that the second and fourth disks constitute a set rotatable about the shaft; also that the three sets of rollers cooperate with the disks in pairs, the first set with the pair consisting of the first and second disks, the second set of rollers cooperating with the pair consisting of the second and third disks, and the third set of rollers cooperating with the third and fourth disks.

Fig. 19 shows a method of connecting the front or torque-reaction spider to the case so as to take the torque but relieve the spider assembly of any side loads that might result from misalignment. This is a feature of advantage, especially with multiple sets of rollers, because of the difficulty of insuring accurate alignment of long casings with three supporting points (as in Fig. 6, for example) and because alignment itself is of great importance in a friction transmission mechanism, where even very slight side thrust on the roller and carrier assembly tends to unbalance the tractive pressures on the rollers.

Referring to Fig. 19, and also Fig. 18: Front spider 365 has the ends of its arms milled to form holding lugs or teeth which match with teeth on a drum or sleeve 367. This sleeve is supported by a web 368a in casing 368 which is cut out to fit it loosely, and is held from turning by a single anchor pin 369 which has a threaded shoulder and hexagonal head for screwing it in place in the casing, the pin, however, permitting the other end of the sleeve to move radially in all directions. The sleeve is thus connected by the pin to the front part of the casing which is in turn bolted to a rear part of the casing. Casing part 370 may be provided with a projection 370a opposite pin 369 and one of the arms of spider 365—the projection 370a, sleeve 367 and pin 369 serving to locate the front spider and hence its power transmitting unit endwise in the casing. To allow perfect freedom of alignment the teeth or notches in sleeve 367 for mating with the other two arms of spider 365 may be cut deeper than those at the locating arm, as indicated in Fig. 19a. It will be understood that the spider is centered on the axis of the transmission shaft and has no radial motion relative thereto. In Fig. 19 the broken lines P indicate the precession axes of the rollers, not shown.

Figs. 20 and 20a illustrate an embodiment in which certain features of Figs. 2 and 5 are combined, so that the valve 69 of Fig. 2 is operated electromagnetically and the translation of the carriers and rollers to initiate precession is effected hydraulically. Fig. 20 also illustrates a control setting mechanism which can be substituted for that of Fig. 5.

Referring to Figs. 20, 20a and 5, the control knob 385 is pinned on a bushing 386 rotatable on shaft 387, and rotatable on the same shaft is an insulating sleeve 388 like sleeve 130 in Figs. 5 and 5a and equipped with contacts 389, 390 (like contacts 131, 132) between which is the contact arm 391, on gear 392, which gear is fixed on shaft 387 and meshes with gear sector 123a. The latter corresponds to the sectors 33 of Figs. 1 and 2 and is rocked by the carrier and roller (not shown) as the roller precesses. Around sleeve 388 and passing through staple 393 fixed on the sleeve is a coil spring 394 the outwardly extending ends 394a, 394b of which embrace the staple and an arm 395 on the flange of bushing 386. A spring washer 396 between the hub of control knob 385 and the casing 14 provides sufficient friction to prevent the tension of spring 394 from turning the knob and the bushing 386. It will be observed that rotation of knob 385 first turns sleeve 388 until contact 389 or stop 390, as the case may be, engages the contact arm 391, after which further rotation of the knob relative to the shaft 387 and gear 392, tensions spring 394. Shaft 30a, cam 44 and arm 40 of Fig. 2 are omitted, as they also are omitted from Fig. 5. Valve 69a has a stem 397 on which is an armature 398 for actuation by an electromagnet 399 energizable by a winding 400 one terminal of which is connected to contact 389. The other terminal is connected to one side of the current source 401 by lead 402. The other side of the source is grounded by lead 403 to the casing 14, to which contact arm 391 is also grounded through gear 392, shaft 387 and bushing 386. A spring 404 serves to depress valve 69a when magnet 398 is deenergized.

When knob 385 is turned clockwise (as seen from above) arm 395 carries end 394b of spring 394 around with it, thus tensioning the spring, and at the same time bringing contact 389 against arm 391, thereby closing the circuit and energizing magnet 399 which raises valve 69a so that high pressure duct 74 delivers pressure to the lower cylinder (65, Fig. 2) whereupon the carrier and roller begin to precess toward the higher speed ratio determined by the extent of the rotation of the control knob. As the carrier rocks (precesses) on the precession axis, gear 392 is rotated by the quadrant or sector 123a and tends to carry contact arm 391 out of engagement with contact 389, but the tensioned spring, unwinding as the precession continues, carries staple 393 clockwise and with it contact 389 until the spring is unwound, which occurs when the staple catches up with arm 395. At this point slight further clockwise movement of contact arm 391 as the roller continues its precession carries arm 391 out of engagement with contact 389, thus breaking the circuit and deenergizing the magnet. The valve 69a then descends, connecting pressure duct 74 to duct 66 (see Fig. 2) which causes the roller and carrier to precess toward a lower speed-ratio. This precession, however, immediately brings contact arm 391 back against contact 389, thus reenergizing the magnet 399, which raises valve 69a, and causes precession toward a high ratio until contact arm 391 again breaks the circuit. Thereafter there is a continual make-and-break at the contacts which causes the magnet to keep the valve in a position providing a mean pressure in duct 67 just sufficient to balance the load on the transmission mechanism. By making the orifices of ducts 66 and 67 of suitable size any desired division of the pressure between the two ducts at the lower position of the valve can be obtained, and it will be understood that with a current source of relatively low voltage, the movement of contact arm 391 necessary to break and re-make the circuit is very slight, so that the oscillation of the precessing roller on either side of the mean position can be made practically insensible.

The use of a preset spring, as 394, to connect the control knob to the precession-governing device or mechanism not only permits the knob to be set instantly to any desired position but also has the advantage of assisting the frictional forces, tending to precess the rollers, by putting a light torque on the gear and sector. The construction described may also be used to advantage in Figs. 1 and 2 to connect the control knob with the cam, in which case only the inclined portion of the cam groove need be provided.

It is to be understood that the invention is not confined to the constructions herein illustrated and described but can be embodied in other forms without departure from its spirit as defined by the appended claims.

I claim:

1. In a variable speed power transmission mechanism, in combination, toric disks and a precessing roller cooperating therewith, a carrier for the roller, mounted for angular movement with the roller on the axis of precession thereof, means operatively associated with the carrier for actuation thereof to initiate precession of the roller, adjustable control mechanism for said carrier actuating means, capable of adjustment in both directions while the transmission mechanism is in operation independently of the rate of precession of the roller, and additional means dependent for operation upon relative movement of the control mechanism and the precessing roller to arrest the same at the speed ratio position determined by the adjustment of the control mechanism.

2. In a variable speed power transmission mechanism, in combination, toric disks and a precessing roller cooperating therewith, a carrier for the rollers, mounted for angular movement on the axis of precession of the roller, means for actuating the carrier to initiate precession of the roller, adjustable control mechanism for said carrier-actuating means and having a control element capable of adjustment in both directions while the transmission mechanism is in operation independently of the rate of precession of the roller, and additional means movable relatively to said control element by the roller as the same precesses to arrest the precessing roller at the speed-ratio position determined by the adjustment of said control element.

3. In a variable speed power transmission mechanism, in combination, toric disks and a precessing roller cooperating therewith; a carrier for the roller, mounted for angular movement on the axis of precession of the roller; control mechanism having a control element capable of adjustment in both directions while the transmission mechanism is in operation independently of the rate of precession of the roller; means for actuating the carrier and roller to initiate and arrest precession, said means cooperating with the said control element for actuation thereby in a direction to initiate precession but ineffective to move the control element; and means, actuated by the roller as the same precesses, to actuate the control mechanism and thereby cause arrest of the precessing roller and leave the control element in the position to which it was adjusted to initiate precession.

4. In a variable speed power transmission mechanism, in combination, toric disks and a precessing friction roller cooperating therewith, fluid-pressure actuated means for moving the roller out of and into equilibrium position to initiate and arrest precession; adjustable valve means to control the fluid pressure and thereby control the actuation of said fluid-pressure means; control means adjustable relatively to the valve means to impart opening and closing adjustment thereto, said control means effective in part to cooperate with the valve means and thereby adjust the same and adapted in part to hold the valve means in a predetermined position of adjustment while the roller is precessing; and means operatively connecting the roller with the valve means to restore the latter to actuating cooperation with the control means to cause reverse adjustment of the valve means and thereby restore the roller to equilibrium position.

5. In a variable speed power transmission mechanism, in combination, toric disks and a precessing roller cooperating therewith, a carrier for the roller, mounted for angular movement on the axis of precession of the roller, means operatively associated with the carrier for actuation thereof to initiate precession of the roller, control mechanism having an element adjustable in both directions relatively to an element of the carrier-actuating means to cause precession of the roller to a new speed-ratio position independently of the rate of the precession, and means connecting the second-mentioned element with the roller carrier to adjust the second-mentioned element relatively to the first as the roller precesses and thereby cause precession to cease at the new speed-ratio position.

6. In a variable speed power transmission mechanism, in combination, toric disks and a precessing roller cooperating therewith, a carrier for the roller, mounted for angular movement on an axis transverse to the axis of rotation of the roller as the latter precesses to vary the speed ratio of the mechanism, means actuated by fluid pressure and operatively associated with the carrier for actuation thereof to initiate precession of the roller, adjustable valve means for varying the effective fluid pressure, adjustable control means for the valve means, capable of adjustment independently of the rate of precession of the roller, and means operatively connecting the roller carrier and the valve means to reversely adjust the latter relatively to the control means as the roller precesses and thereby arrest the precessing roller at the speed ratio position determined by the adjustment of the control mechanism.

7. In a variable speed power transmission mechanism, in combination, toric disks and a precessing roller cooperating therewith, a carrier for the roller, mounted for angular movement on an axis transverse to the axis of rotation of the roller as the latter precesses to vary the speed ratio of the mechanism, means actuated by fluid pressure and operatively associated with the carrier for actuation thereof to initiate precession of the roller, adjustable valve means for varying the effective fluid pressure, an adjustable control cam connected with the valve means and movable relatively thereto to adjust the same for initiating precession to a desired speed ratio, and means operatively connecting the roller carrier with the valve means to shift the latter relatively to the cam as the roller precesses and thereby reversely adjust the valve means to arrest the precessing roller at the speed ratio position for which the cam was adjusted.

8. In a variable speed power transmission mechanism, in combination, toric disks and a precessing roller cooperating therewith; a carrier for the roller, mounted for angular movement on the axis of precession of the roller; fluid pressure means for moving the carrier and roller out of and into equilibrium position to initiate and arrest precession; a control valve for the fluid pressure means; a control cam cooperating with the valve and adjustable relatively thereto, the cam having a part adapted to move the valve in the opening or closing direction as the cam is adjusted, and a part adapted to hold the valve in the position to which it is moved by the first mentioned part; and means, actuated by the roller as the same precesses, to move the valve relatively to the cam out of cooperation wtih the holding part of the cam and into cooperation with the actuating part thereof.

9. In a variable speed power transmission mechanism, in combination, toric disks and a precessing friction roller cooperating therewith, fluid-pressure actuated means for moving the rollers out of and into equilibrium position to initiate and arrest precession; adjustable valve means to control the fluid pressure and thereby control the actuation of said fluid-pressure means; a control cam adjustable relatively to the valve means, said cam having a part effective to cooperate with the valve means and thereby adjust the same for initiating and arresting precession, and having a part effective to hold the valve means in a predetermined position of adjustment while the roller is precessing; and means operatively connecting the roller with the valve means to restore the latter to cooperation with said effective part of the control cam whereby to cause reverse adjustment of the valve means and consequent restoration of the roller to equilibrium position.

10. In a variagle speed power transmission mechanism, in combination, toric disks and a precessing roller cooperating therewith, a carrier for the roller, a carrier support, fluid pressure means carried in part by the support and in part by the carrier for actuating the latter to initiate precession of the roller, a source of fluid pressure connected with said means to operate the latter when the pressure is varied, means adjustable to vary the fluid pressure while the transmission mechanism is in operation independently of the rate of the resulting precession of the roller, and means actuated by the roller as it precesses to cause reverse actuation of said adjustable means and thereby cause precession to cease at a new speed-ratio position.

11. In a variable speed power transmission mechanism, in combination, toric disks and a precessing roller cooperating therewith, a carrier for the roller movable angularly with the roller as the latter precesses, a carrier support, fluid-pressure means carried in part by the support and in part by the carrier for actuating the latter to cause precession of the roller, a source of fluid pressure connected with said means to operate the latter when the pressure is varied, adjustable valve means for varying the fluid pressure, control means for the valve means, capable of adjustment while the transmission mechanism is in operation independently of the rate of precession of the rollers, and means operatively connecting the carrier and the valve means to reversely adjust the latter as the roller precesses and thereby arrest the precessing roller at the speed ratio position determined by the adjustment of the control means.

12. In a variable speed power transmission mechanism, in combination, toric disks and a roller cooperating therewith for precession to a higher or lower speed-ratio position; a carrier for the roller, mounted for angular movement on the axis of precession of the roller; control mechanism having a control element capable of adjustment in both directions while the transmission mechanism is in operation independently of the rate of precession of the roller; means for moving the carrier and roller to initiate precession to a higher or lower speed-ratio position according to the direction of the movement imparted to the carrier and roller by said means, said means cooperating with the control element for control actuation thereby; means, actuated by the roller as the same precesses, to actuate the control mechanism and thereby cause arrest of the precessing roller at the speed-ratio position for which the control element was adjusted; and automatic means, acting when the direction of operation of the transmission mechanism is reversed, to reverse the direction of the movement which the first mentioned means imparts to the carrier and roller.

13. In a variable speed power transmission mechanism, in combination, toric disks and a precessing roller cooperating therewith; a carrier for the roller, mounted for angular movement on the axis of precession of the roller; fluid pressure actuated means for moving the carrier and roller out of and into equilibrium position to initiate precession to a higher or lower speed ratio position according to the direction of the fluid supplied to said means; means for supplying fluid to the fluid pressure actuated means; control means adjustable for effecting change of direction of the fluid supplied to the carrier-moving means; and automatic means to reverse the fluid-directing effect of the control means when the direction of operation of the transmission mechanism is reversed.

14. In a variable speed power transmission mechanism, in combination, toric disks and a precessing roller cooperating therewith, a carrier for the roller, mounted for angular movement with the roller as the latter precesses, means actuated by fluid pressure and operatively associated with the carrier for actuation thereof to initiate precession of the roller to a higher or lower speed-ratio position according to the direction of the fluid pressure, adjustable valve means for varying the effective fluid pressure, an adjustable control cam connected with the valve means and movable relatively thereto to adjust the valve means for initiating precession to a desired speed ratio, means operatively connecting the roller carrier with the valve means to shift the latter relatively to the cam as the roller precesses and thereby reversely adjusts the valve means to arrest the precessing roller at the speed ratio position for which the cam was adjusted, and automatic means for reversing the direction of the fluid pressure when the direction of operation of the transmission mechanism is reversed.

15. In a variable speed power transmission mechanism, in combination, toric disks and a precessing roller cooperating therewith, a carrier for the roller, mounted for angular movement with the roller as the latter precesses, a carrier support, means actuated by fluid pressure between the support and the carrier to shift the latter for initiating precession of the roller to a higher or lower speed-ratio position according to the direction of the fluid pressure, a source of fluid pressure having connections with said means for delivering pressure fluid thereto in different directions, adjustable valve means for varying the effective fluid pressure, adjustable control means connected with the valve means and movable relatively thereto while the transmission mechanism is in operation to adjust the valve means for initiating precession to a desired speed ratio, means operatively connecting the roller carrier with the valve means to shift the latter relatively to the cam as the roller precesses and thereby reversely adjust the valve means to arrest the precessing roller at the speed ratio position for which the cam was adjusted, and automatic means for reversing the connections of the source of fluid pressure to the fluid-pressure actuated means when the direction of operation of the transmission mechanism is reversed.

16. In a variable speed power transmission mechanism, in combination, toric disks and a precessing roller cooperating therewith, a carrier for the roller, mounted for angular movement with the roller as the latter precesses, a carrier support, means actuated by fluid pressure and operatively associated with the carrier for actuation thereof to initiate precession of the roller to a higher or lower speed-ratio position according to the direction of the fluid pressure, said means comprising fluid-receiving means and means actuated by the pressure of the fluid received thereby, a source of fluid pressure having connections with said fluid receiving means to deliver pressure fluid thereto on opposite sides of the means to be actuated thereby, adjustable means for varying the effective pressure of the fluid delivered by said source, and automatic means for reversing the connections of the source of fluid pressure to said fluid-receiving means when the direction of operation of the transmission mechanism is reversed.

17. In a variable speed power transmission mechanism, in combination, toric disks and a precessing roller cooperating therewith, a carrier for the roller, movable angularly with the roller as the latter precesses, a carrier support, means actuated by fluid pressure and operatively associated with the support and the carrier for actuation of the latter to shift the same for initiating precession of the roller toward a higher or lower speed-ratio according to the direction of the fluid pressure, a source of pressure fluid connected with the fluid pressure actuated means, means actuated by the fluid delivered by said source to reverse the direction of the pressure when the direction of rotation of the transmission mechanism is reversed, adjustable valve means for varying the effective fluid pressure in each direction, and means operatively connecting the roller carrier with the valve means to reversely adjust the same and thereby cause precession of the roller to cease at a new speed-ratio position.

18. In a variable speed power transmission mechanism, in combination, toric disks and a precessing roller cooperating therewith, a carrier for the roller movable angularly with the roller as the latter precesses, a carrier support, means actuated by fluid pressure and operatively associated with the support and the carrier for actuation of the latter to shift the same transversely of the axis of rotation of the roller, for initiating precession thereof toward a higher or lower speed ratio position according to the direction of the fluid pressure, said means comprising parts mounted on the carrier and parts mounted on the carrier support, automatic means for reversing the direction of the fluid pressure when the direction of rotation of the transmission mechanism is reversed, adjustable valve means for varying the effective fluid pressure in each direction, an adjustable control cam connected with the valve means and movable relatively thereto to adjust the same, and means operatively connecting the roller carrier with the valve means to shift the latter relatively to the cam as the roller precesses and thereby reversely adjust the valve means to arrest the precessing roller at the speed ratio position for which the cam was adjusted.

19. In a variable speed power transmission mechanism, in combination, toric disks and a precessing roller cooperating therewith, a carrier for the roller, mounted for angular movement with the roller as the latter precesses, means actuated by fluid pressure and operatively associated with the carrier for actuation thereof to initiate precession of the roller to a higher or lower speed-ratio position according to the direction of the fluid pressure, a source of fluid pressure comprising a reversible pump driven by the transmission mechanism and having connections with the fluid pressure actuated means, means actuated by the pressure fluid from said pump to reverse said connections when the pump is reversed by the transmission mechanism, adjustable valve means for varying the effective fluid pressure in each direction, an adjustable control cam connected with the valve means and movable relatively thereto while the transmission mechanism is in operation to adjust the valve means for initiating precession to a desired speed ratio, and means operatively connecting the roller carrier with the valve means to shift the latter relatively to the cam as the roller precesses and thereby reversely adjust the valve means to arrest the precessing roller at the speed ratio position for which the cam was adjusted.

20. In a variable speed power transmission mechanism, in combination, toric disks and a precessing roller cooperating therewith, a carrier for the roller, mounted for angular movement with the roller as the latter precesses, means actuated by fluid pressure and operatively associated with the carrier for actuation thereof to initiate precession of the roller to a higher or lower speed-ratio position according to the direction of the fluid pressure, automatic means for reversing the direction of the fluid pressure when the direction of operation of the transmission mechanism is reversed, adjustable valve means for varying the effective fluid pressure, said valve means comprising a valve controlling escape of fluid pressure from said fluid-pressure actuated means and an element connected with the valve to adjust the same; a control cam cooperating with said element, the cam being movable in one direction relatively to said element to decrease the escape of pressure fluid and in the other direction to increase such escape; and means operatively connecting the roller carrier with the element to shift the same relatively to the cam in the direction of movement of the latter and thereby reversely adjust the valve means to arrest the precessing roller at a new speed ratio position.

21. In a variable speed power transmission mechanism, in combination, toric disks and a precessing roller cooperating therewith, a carrier for the roller, mounted for angular movement with the roller as the latter precesses, a carrier support, means actuated by fluid pressure at the opposite ends of the carrier to shift the same longitudinally and thereby initiate precession of the roller to a higher or lower speed-ratio position according to the direction of the fluid pressure, said means comprising members connected with the carrier support and the carrier and adapted to expand and collapse; automatic means for reversing the direction of the fluid pressure when the direction of operation of the transmission mechanism is reversed, adjustable valve means for varying the effective fluid pressure, said valve means comprising a valve controlling escape of fluid pressure from said fluid-pressure actuated means and an element connected with the valve to adjust the same; a control cam cooperating with said element, the cam being movable in one direction relatively to said element to decrease the escape of pressure fluid and in the other direction to increase such escape; and means operatively connecting the roller carrier with the element to shift the same relatively to the cam in the direction of movement of the latter and thereby reversely adjust the valve means to arrest the precessing roller at a new speed ratio position.

22. In a variable speed power transmission mechanism, in combination, toric disks and a precessing roller cooperating therewith, a carrier for the roller, mounted for angular movement with the roller as the latter precesses, a carrier support, means actuated by fluid pressure and operatively associated with the carrier for actuation thereof to initiate precession of the roller, said means comprising expansible and collapsible bellows between the carrier support and opposite ends of the carrier, adjustable valve means for varying the effective fluid pressure, said valve means comprising a valve controlling escape of fluid pressure from said fluid-pressure actuated means and an element connected with the valve to adjust the same; a control cam cooperating with said element, the cam being movable in one direction relatively to said element to decrease the escape of pressure fluid and in the other direction to increase such escape; and means operatively connecting the roller carrier with the said element to shift the same relatively to the cam in the direction of movement of the latter and thereby reversely adjust the valve means to arrest the precessing roller at a new speed ratio position.

23. In a variable speed power transmission mechanism, in combination, toric disks and a precessing roller cooperating therewith, a carrier for the roller, mounted for angular movement with the roller as the latter precesses, a carrier support, means actuated by fluid pressure and operatively associated with the carrier for actuation thereof to initiate precession of the roller to a higher or lower speed-ratio position, said means comprising expansible and collapsible bellows connected to opposite ends of the carrier and to the carrier support; adjustable valve means for varying the effective fluid pressure, said valve means comprising a valve controlling escape of pressure fluid from said fluid-pressure actuated means; control means cooperating with said valve means and movable in one direction relatively to said valve means to decrease the escape of pressure fluid and in the other direction to increase such escape; and means operatively connecting the roller carrier with the valve means to shift the same relatively to the control means in the direction of movement of the latter and thereby reversely adjust the valve means to arrest the precessing roller at a new speed ratio position.

24. In a variable speed power transmission mechanism, in combination, toric disks and a precessing roller cooperating therewith, a carrier for the roller movable angularly with the roller as the latter precesses, a carrier support, means actuated by fluid pressure and operatively associated with the support and the carrier for actuation of the latter to shift the same for initiating precession of the roller, said means comprising expansible and collapsible bellows connected to opposite ends of the carrier and to the carrier support, adjustable valve means for varying the effective fluid pressure, an adjustable control cam connected with the valve means and movable relatively thereto to adjust the same and thereby initiate precession of the roller and carrier toward a new speed-ratio position, and means operatively connecting the roller carrier with the valve means to shift the latter relatively to the cam as the roller precesses and thereby reversely adjust the valve means to arrest the precessing roller at the speed ratio position for which the cam was adjusted.

25. In a variable speed power transmission mechanism, in combination, toric disks and a precessing roller cooperating therewith, a longitudinally shiftable carrier for the roller movable angularly with the roller as the latter precesses, a carrier support, means actuated by fluid pressure and operatively associated with the support and the carrier for actuation of the latter to shift the same longitudinally for initiating precession of the roller, said means comprising expansible and collapsible bellows connected to opposite ends of the carrier and to the carrier support, adjustable valve means for varying the effective fluid pressure, adjustable control means connected with the valve means and movable relatively thereto for adjusting the same to initiate precession to a new speed-ratio position, and means operatively connecting the roller carrier with the valve means to reversely adjust the valve means and thereby arrest the precessing roller at the new speed-ratio position.

26. In a variable speed power transmission mechanism, in combination, toric disks and a precessing roller cooperating therewith, an element comprising a longitudinally shiftable carrier for the roller movable angularly with the roller as the latter precesses, an element comprising a carrier support, expansible and collapsible bellows between said elements at opposite ends of the carrier, a source of fluid pressure, means connecting one of the bellows with one side of said source and means connecting the other bellows with the other side of said source whereby either may receive pressure fluid, means actuated by pressure fluid from said source to reverse said connecting means when the direction of rotation of the transmission mechanism is reversed, adjustable valve means to vary the pressure delivered to the bellows receiving pressure fluid from said source, adjustable means connected with the valve means and movable relatively thereto for adjusting the same to cause precession to a new speed-ratio, and means operatively connecting the roller carrier with the valve means to shift the latter relatively to said adjustable means as the roller precesses and thereby reversely adjust the valve means to arrest the precessing roller.

27. In a variable speed power transmission mechanism, in combination, toric disks and a precessing roller cooperating therewith, a roller carrier shiftable longitudinally to cause precession of the roller and movable angularly with the roller as the same precesses, a carrier support, and fluid pressure actuated means between the support and the carrier and surrounding an end of the latter to shift the same longitudinally.

28. In a variable speed power transmission mechanism, in combination, toric disks, a roller carrier equipped with bearings, a precessing roller rotatable in said bearings to cooperate with the disks, a carrier support, and fluid pressure means between the carrier and the support to actuate the carrier for initiating precession of the rollers, the carrier being equipped with means for supplying pressure fluid from the fluid pressure means to the bearings to lubricate the same.

29. In a variable speed power transmission mechanism, in combination, toric disks and a precessing roller cooperating therewith, an element comprising a longitudinally shiftable carrier for the roller movable angularly with the roller as the latter precesses, an element comprising a carrier support, expansible and collapsible bellows associated with said elements to actuate the carrier for initiating precession of the roller, a source of fluid pressure, means for delivering fluid pressure to said bellows, and adjustable valve means to vary the pressure delivered to the bellows.

30. In a variable speed power transmission mechanism, in combination, toric disks and a precessing roller cooperating therewith, an element comprising a longitudinally shiftable carrier for the roller movable angularly with the roller as the latter precesses, an element comprising a carrier support, expansible and collapsible bellows between said elements at opposite ends of the carrier, said bellows carried by one of said elements and connected to the other element, a source of fluid pressure, means for delivering fluid pressure to either bellows at will, and adjustable valve means to vary the pressure delivered to the bellows receiving pressure fluid from said source.

31. In a variable speed power transmission mechanism, in combination, toric disks and a precessing roller cooperating therewith, a roller carrier shiftable longitudinally to cause precession of the roller and movable angularly with the roller as the same precesses, a carrier support, means between the support and the carrier and adapted for actuation by fluid pressure to shift the carrier longitudinally, and adjustable means for limiting the shifting movement of the carrier to a predetermined maximum.

32. In a variable speed power transmission mechanism, in combination, toric disks and a precessing roller cooperating therewith, an element comprising a roller carrier shiftable longitudinally to cause precession of the roller and movable angularly with the roller as the same precesses, an element comprising a carrier support, and means between said elements and adapted for actuation by fluid pressure to shift the carrier longitudinally, said means comprising expansible and collapsible bellows at opposite ends of the carrier, connected with said elements for longitudinal and angular movement of the carrier.

33. In a variable speed power transmission mechanism, in combination, toric disks and a precessing roller cooperating therewith, a roller carrier shiftable longitudinally to cause precession of the roller and movable angularly with the roller as the same precesses, a carrier support having passages for pressure fluid, tubular stems at opposite ends of the support and in communication with said passages, expansible and collapsible bellows connected to the carrier at opposite ends thereof, in communication with the respective tubular stems and mounted thereon for angular movement with the carrier as the roller precesses.

34. In a variable speed power transmission mechanism, in combination, spaced coaxial toric disks and a shaft at the axis thereof, said disks and shaft being connected for rotation as a unit, an intermediate toric disk between the spaced disks, coaxial therewith and rotatable about the shaft, a first set of precessing rollers cooperating with the intermediate disk and an adjacent spaced disk, carriers for said rollers, movable angularly with the rollers as the latter precess and movable to initiate precession of the rollers, a support for the carriers of the first set of rollers, means associated with said support and carriers to actuate the latter for initiating precession of the rollers, a second set of rollers cooperating with the intermediate disk and the other adjacent spaced disk, carriers for the rollers of the second set, a carrier support arranged between the intermediate disk and said other spaced disk and equipped with fluid pressure ducts, fluid pressure means associated with the last mentioned support and carriers to actuate the latter for initiating precession and connected with said ducts to receive fluid pressure therefrom, pressure fluid conveying means extending through the intermediate disk and connected with said ducts to deliver pressure fluid thereto, means for varying the pressure of such pressure fluid in harmony with the precession-initiating actuation of the carriers of the first set of rollers, control mechanism common to the carrier-actuating means of both sets and adjustable in both directions to control the operation of such means independently of the rate of the resulting precession, and means dependent for operation upon the resulting precession of at least one roller to reversely adjust said control mechanism and thereby cause precession to cease at a new speed-ratio position.

35. In a variable speed power transmission mechanism, in combination, spaced coaxial toric disks and a shaft at the axis thereof, said disks and shaft being connected for rotation as a unit, an intermediate toric disk between the spaced disks, coaxial therewith and rotatable about the shaft, sets of precessing rollers cooperating with the intermediate disk and the said spaced disks respectively, carriers for the rollers, movable angularly with the rollers as the latter precess and movable to initiate precession of the rollers, carrier supports arranged between the intermediate disk and the said spaced disks and equipped with fluid pressure ducts, fluid pressure means between the carriers and the carrier supports and connected with said ducts for actuation by fluid pressure therefrom to actuate the carriers and initiate precession of the rollers, pressure fluid conveying means extending through the intermediate disk and connected with said ducts to deliver pressure fluid thereto simultaneously, a source of pressure fluid connected with said conveying means, means adjustable to vary the effective fluid pressure delivered by said source to said conveying means while the transmission is in operation independently of the rate of the resulting precession of the rollers, and means actuated by at least one precession roller to reversely actuate said adjustable means and thereby cause precession to cease at a new speed-ratio position.

36. In a variable speed power transmission mechanism, in combination, spaced coaxial toric disks and a shaft at the axis thereof, said disks and shaft being connected for rotation as a unit, an intermediate toric disk between the spaced disks, coaxial therewith and rotatable about the shaft, sets of precessing rollers cooperating with the intermediate disk and the said spaced disks respectively, carriers for the rollers, movable angularly with the rollers as the latter precess and movable to initiate precession of the rollers, carrier supports arranged between the intermediate disk and the said spaced disks and equipped with fluid pressure ducts, fluid pressure means between the carriers and the carrier supports and connected with said ducts for actuation by fluid pressure therefrom to actuate the carriers and initiate precession of the rollers, sleeves surrounding the shaft and extending through the intermediate disk and providing passages connected with said ducts to deliver pressure fluid thereto, a source of fluid pressure connected with said passages, means adjustable to vary the fluid pressure delivered by said source to said fluid pressure means while the transmission is in operation independently of the rate of the resulting precession of the rollers, and means actuated by at least one precession roller to reversely actuate said adjustable means and thereby cause precession of all the rollers to cease at a new speed-ratio position.

37. In a variable speed power transmission mechanism, in combination, spaced coaxial toric disks and a shaft at the axis thereof, said disks and shaft being connected for rotation as a unit, an intermediate toric disk between the spaced disks, coaxial therewith and rotatable about the shaft, sets of precessing rollers cooperating with the intermediate disk and the said spaced disks respectively, carriers for the rollers, movable angularly with the rollers as the latter precess and movable to initiate precession of the rollers, carrier supports arranged between the intermediate disk and the said spaced disks and equipped with fluid pressure ducts, fluid pressure actuated means between the carriers and the carrier supports and connected with said ducts for actuation by fluid pressure therefrom to actuate the carriers and initiate precession of the rollers, fluid pressure conveying means extending through the intermediate disk and connected with said ducts to deliver pressure fluid thereto, a source of fluid pressure connected with said conveying means, and control means to vary the effective fluid pressure delivered to the fluid pressure actuated means.

38. In a variable speed power transmission mechanism, in combination, spaced coaxial toric disks and a shaft at the axis thereof, said disks and shaft being connected for rotation as a unit, an intermediate toric disk between the spaced disks, coaxial therewith and rotatable about the shaft, sets of precessing rollers cooperating with the intermediate disk and the said spaced disks respectively, carriers for the rollers, movable angularly with the rollers as the latter precess and movable to initiate precession of the rollers, carrier supports arranged between the intermediate disk and the said spaced disks and equipped with fluid pressure ducts, fluid pressure actuated means between the carriers and the carrier supports and connected with said ducts for actuation by fluid pressure therefrom to actuate the carriers and initiate precession of the rollers, sleeves surrounding the shaft and extending through the intermediate disk and providing passages connected with said ducts to deliver pressure fluid thereto, a source of fluid pressure connected with said passages, and control means to vary the effective fluid pressure delivered to the fluid pressure actuated means.

39. In a variable speed power transmission mechanism, in combination, spaced coaxial toric disks and a shaft at the axis thereof, said disks and shaft being connected for rotation as a unit, an intermediate toric disk between the spaced disks, coaxial therewith and rotatable about the shaft, sets of precessing rollers cooperating with the intermediate disk and the said spaced disks respectively, carriers for the rollers, movable angularly with the rollers as the latter precess and movable to initiate precession of the rollers, carrier supports arranged between the intermediate disk and the said spaced disks and equipped with fluid pressure ducts, fluid pressure cylinders associated with the carriers and the carrier supports and connected with said ducts for receiving fluid pressure therefrom to actuate the carriers and initiate precession of the rollers, sleeves surrounding the shaft and extending through the intermediate disk and providing passages connected with said ducts to deliver pressure fluid thereto, a source of fluid pressure connected with said passages, and control means to vary the effective fluid pressure delivered to the fluid pressure cylinders.

40. In a variable speed power transmsision mechanism, in combination, spaced coaxial toric disks and a shaft at the axis thereof, said disks and shaft being connected for rotation as a unit, an intermediate toric disk between the spaced disks, coaxial therewith and rotatable about the shaft, sets of precessing rollers cooperating with the intermediate disk and the said spaced disks respectively, carriers for the rollers, movable angularly with the rollers as the latter precess and movable to initiate precession of the rollers, carrier supports arranged between the intermediate disks and the said spaced disks and equipped with fluid pressure ducts, fluid pressure cylinders associated with the carriers and the carrier supports and connected with said ducts to receive pressure fluid therefrom for precession-initiating actuation of the carriers, and means for delivering pressure fluid to said ducts.

41. In a variable speed power transmission mechanism, in combination, toric disks and a precessing roller cooperating therewith, a carrier for the roller, movable anguarly with the roller as the latter precesses and movable longitudinally to initiate precession of the roller, a carrier support equipped with fluid pressure ducts, and fluid pressure cylinders associated with the support and the carrier, surrounding an end of the latter for effecting precession-initiating actuation thereof and connected with said ducts to receive pressure fluid therefrom.

42. In a variable speed power transmission mechanism, in combination, toric disks and a precessing roller cooperating therewith, a carrier for the roller, movable angularly with the roller as the latter precesses and movable longitudinally to initiate precession of the roller, a carrier support equipped with fluid pressure ducts, fluid pressure cylinders associated with the support and the carrier for shifting the carrier longitudinally and connected with said ducts to receive pressure fluid therefrom, and adjustable stops to determine the extent of the longitudinal movement of the carrier.

43. In a variable speed power transmission mechanism of the toric disk and precessing roller type, a roller, a carrier for the roller, movable angularly with the roller as the latter precesses, fluid pressure cylinders at the ends of the carrier, and pistons movable in the cylinders and connected with the carrier to shift the same for initiating precession of the roller.

44. In a variable speed power transmission mechanism, in combination, a plurality of spaced coaxial disks constituting a first set and a shaft at the axis thereof, said disks and shaft being connected to rotate as a unit, a plurality of disks constituting a second set, rotatable about the shaft and alternating with the disks of the first set, a plurality of sets of rollers cooperating with and individual to successive pairs of disks, carriers for the rollers, movable angularly with the rollers as the latter precess and movable to initiate precession, carrier supports individual to the sets of rollers and equipped with fluid pressure ducts, fluid pressure cylinders associated with the carriers and the respective supports and connected with the ducts thereof to receive pressure fluid for precession-initiating actuation of the carriers, a source of pressure fluid, means for delivering pressure fluid from said source to the ducts of the respective supports, adjustable valve means for varying the pressure of the fluid delivered to said fluid pressure cylinders, means for adjusting the valve means in both directions while the transmission mechanism is in operation independently of the rate of the resulting precession, and means actuated by at least one precessing roller to reversely adjust the valve means and thereby cause precession of all the rollers to cease at a new speed-ratio position.

45. In a variable speed power transmission mechanism, in combination, a plurality of spaced coaxial disks constituting a first set and a shaft at the axis thereof, said disks and shaft being connected to rotate as a unit, a plurality of disks constituting a second set, rotatable about the shaft and alternating with the disks of the first set, a plurality of sets of rollers cooperating with and individual to successive pairs of disks, carriers for the rollers, movable angularly with the rollers as the latter precess and movable to initiate precession, carrier supports individual to the sets of rollers and equipped with fluid pressure ducts, fluid pressure means associated with the carriers and the respective supports to effect precession-initiating actuation of the carriers and conencted with the ducts thereof to receive pressure fluid, a source of pressure fluid, means for delivering pressure fluid from said source to the ducts of the respective supports, and control means for varying the pressure of the fluid delivered to said fluid pressure means for precession-initiating actuation of the carriers.

46. In a variable speed power transmission mechanism, in combination, a plurality of spaced coaxial disks constituting a first set and a shaft at the axis thereof, said disks and shaft being connected to rotate as a unit, a plurality of disks constituting a second set, rotatable about the shaft and alternating with the disks of the first set, a plurality of sets of rollers cooperating with and individual to successive pairs of disks, carriers for the rollers, movable angularly with the rollers as the latter precess and movable to initiate precession, carrier supports individual to the sets of rollers and equipped with fluid pressure ducts, fluid pressure cylinders associated with the carriers and the respective supports and connected with the ducts thereof to receive pressure fluid for precession-initiating actuation of the carriers, means for delivering pressure fluid from said source to the ducts of the respective supports, adjustable valve means for varying the pressure of the fluid delivered to said ducts, and means actuated by at least one precessing roller to reversely adjust the valve means and thereby cause precession of all the rollers to cease at a new speed-ratio position.

47. In a variable speed power transmission mechanism, in combination, a plurality of spaced coaxial disks constituting a first set and a shaft at the axis thereof, said disks and shaft being connected to rotate as a unit, a plurality of disks constituting a second set, rotatable about the shaft and alternating with the disks of the first set, a plurality of sets of rollers cooperating with and individual to successive pairs of disks, carriers for the rollers, movable angularly with the rollers as the latter precess and movable to initiate precession, carrier supports individual to the sets of rollers and equipped with fluid pressure ducts, fluid pressure cylinders associated with the carriers and the respective supports and connected with the ducts thereof to receive pressure fluid for precession-initiating actuation of the carriers, a source of pressure fluid, means for delivering pressure fluid from said source to the ducts of the respective supports, and valve means for varying the pressure of the fluid delivered to said fluid pressure cylinders.

FRANK ANDERSON HAYES.